US007423975B2

(12) United States Patent
Johnson et al.

(10) Patent No.: US 7,423,975 B2
(45) Date of Patent: Sep. 9, 2008

(54) METHOD, APPARATUS AND COMPUTER PROGRAM PRODUCT FOR PERFORMING DATA PACKET CLASSIFICATION

(75) Inventors: Thomas L Johnson, Gainesville, GA (US); Joel Danzig, Alpharetta, GA (US); Paul Burrell, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 936 days.

(21) Appl. No.: 10/087,779

(22) Filed: Mar. 5, 2002

(65) Prior Publication Data

US 2003/0169735 A1    Sep. 11, 2003

(51) Int. Cl.
*H04L 12/26* (2006.01)
*H04L 12/56* (2006.01)
(52) U.S. Cl. ........................... 370/252; 370/392
(58) Field of Classification Search ............ 370/392
See application file for complete search history.

(56) References Cited

U.S. PATENT DOCUMENTS

| | | | | |
|---|---|---|---|---|
| 6,453,360 | B1* | 9/2002 | Muller et al. | 709/250 |
| 6,529,508 | B1* | 3/2003 | Li et al. | 370/392 |
| 6,570,884 | B1* | 5/2003 | Connery et al. | 370/419 |
| 6,598,057 | B1* | 7/2003 | Synnestvedt et al. | 707/200 |
| 6,600,744 | B1* | 7/2003 | Carr et al. | 370/392 |

(Continued)

FOREIGN PATENT DOCUMENTS

EP    1 128 609 A2    8/2001
WO    WO 01/59702 A1    8/2001

OTHER PUBLICATIONS

Data-Over-Cable Service Interface Specifications, Radio Frequency Interface Specification, SP-RFIv1.1-109-020830, Cable Television Laboratories, Inc., Aug. 30, 2002.

(Continued)

*Primary Examiner*—Wing F. Chan
*Assistant Examiner*—Gregory B Sefcheck
(74) *Attorney, Agent, or Firm*—Sterne, Kessler, Goldstein & Fox PLLC

(57) ABSTRACT

A method, apparatus and computer program product is provided for classifying a target data packet entering a network interface. For each of a plurality of received classification parameters, at least one program module is generated. Each program module tests a pre-defined field(s) of the target data packet for adherence to the classification parameter(s) with which the program module is associated. A pre-classification header is generated wherein an indication is made of where one or more pre-defined fields are located in the data packet if the field is present. Maintaining locations of the pre-defined fields of the target data packet in the pre-classification header prevents having to recalculate the addresses of the pre-defined fields of the target data packet. Eliminating the need for re-calculating the addresses of the pre-defined field(s) can allow the classification process of the present invention to obtain an optimal execution speed.

27 Claims, 19 Drawing Sheets

U.S. PATENT DOCUMENTS

| | | | |
|---|---|---|---|
| 6,728,243 B1 * | 4/2004 | Jason et al. | 370/392 |
| 6,728,255 B1 * | 4/2004 | Tzeng | 370/428 |
| 6,768,738 B1 * | 7/2004 | Yazaki et al. | 370/392 |
| 7,110,404 B1 * | 9/2006 | Temoshenko | 370/390 |
| 2004/0213224 A1 * | 10/2004 | Goudreau | 370/389 |

OTHER PUBLICATIONS

European Search Report issued in EP Appl. No. 03004750.0, dated Oct. 31, 2005, 3 pages.

Chandranmenon, G.P., et al., "Trading Packet Headers For Packet Processing", Computer Communication Review, Oct. 1, 1995, pp. 162-173, vol. 25, No. 4, Association for Computing Machinery, New York, US.

Huang, Nen-Fu, et al., "Design Of Multi-Field IPv6 Packet Classifiers Using Ternary CAMs", 2001 IEEE Global Telecommunications Conference, Nov. 25, 2001, pp. 1877-1881, vol. 3 of 6, IEEE, New York, US.

* cited by examiner

Pre-classification Flowchart

| Bit Position | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | |
| FLAGS 665 | | | | | | | | | DIX_Base 610 | | | | | | |
| TL_Base 615 | | | | | | | | | PQ_Base 625 | | | | | | |
| IP_Base 630 | | | | | | | | | ULP_Base 635 | | | | | | |
| reserved 620a | | | | | | | | | reserved 620b | | | | | | |
| 0-n bits: Other pre-classification information as appropriate 621 | | | | | | | | | | | | | | | |
| Packet PDU 645 | | | | | | | | | | | | | | | |

FIG. 6A

| Flag Bit Position | | | | | | | | |
|---|---|---|---|---|---|---|---|---|
| 7 | 6 | 5 | 4 | 3 | 2 | 1 | 0 | |
| LLC 650 | SNAP 655 | PQ 660 | IP 665 | TCP 670 | UDP 675 | reserved 680 | | |

| | | Byte | Byte | Byte | Byte |
|---|---|---|---|---|---|
| 802.3 Header | DA/SA | 00 | 10 | 18 | 01 |
| | | 02 | 03 | 00 | 10 |
| | | 18 | 04 | 05 | 06 |
| | Type/Len | 81 | 00 | | |
| 802.1Q Header | TCI/TL | 00 | 00 | 08 | 00 |
| IP Header | V/IHL/TOS/TL | 45 | 00 | 00 | 6e |
| | ID/FL/FO | 00 | 00 | 00 | 00 |
| | TTL/PROT/HCS | 00 | 25 | xx | xx |
| | Src IP Addr | 01 | 02 | 03 | 04 |
| | Dest IP Addr | 05 | 06 | 07 | 08 |
| IP Payload | (90 bytes) | 00... | | | |

| 802.3 Header | DA/SA | Byte 00 | Byte 10 | Byte 18 | Byte 01 |
|---|---|---|---|---|---|
| | | 02 | 03 | 00 | 10 |
| | | 18 | 04 | 05 | 06 |
| | Type/Len | 00 | 72 | | |
| 802.2 LLC/SNAP Hdr | DSAP/SSAP/Ctl | aa | aa | 03 | |
| | OUI | 00 | 10 | 18 | |
| | TYPE | 08 | 06 | | |
| Payload | (106 bytes) | 00... | | | |

| 802.3 Header | DA/SA | Byte 00 | Byte 10 | Byte 18 | Byte 01 |
|---|---|---|---|---|---|
| | | 02 | 03 | 00 | 10 |
| | | 18 | 04 | 05 | 06 |
| | Type/Len | 00 | 72 | | |
| 802.2 LLC Hdr | DSAP/SSAP/Ctl | 00 | 00 | 0x?3 | |
| LLC Payload | (111 bytes) | 00... | | | |

| 802.3 Header | DA/SA | Byte 00 | Byte 10 | Byte 18 | Byte 01 |
|---|---|---|---|---|---|
| | | 02 | 03 | 00 | 10 |
| | | 18 | 04 | 05 | 06 |
| | Type/Len | 00 | 72 | | |
| 802.2 LLC/SNAP Hdr | DSAP/SSAP/Ctl | aa | aa | 03 | |
| | OUI | 00 | 10 | 18 | |
| | Type | 08 | 00 | | |
| IP Header | V/IHL/TOS/TL | 45 | 00 | 00 | 6a |
| | ID/FL/FO | 00 | 00 | 00 | 00 |
| | TTL/PROT/HCS | 00 | 25 | xx | xx |
| | Src IP Addr | 01 | 02 | 03 | 04 |
| | Dest IP Addr | 05 | 06 | 07 | 08 |
| IP Payload | (86 bytes) | 00... | | | |

FIG. 7D

Primitive Generation

Test Application

| Byte | | | | | | | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |
| OP | OFFSET | reserved | | Operand 1 (mask) | | | | Operand 2 (low bound) | | | | Operand 3 (high bound) | | | |

Fig. 15A

| Byte | | | | | | | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |
| OP | OFFSET | reserved | | Operand 1 (mask) | | | | | | Operand 2 (compare value) | | | | | |

Fig. 15B

| Bit Position | | | | | | | |
|---|---|---|---|---|---|---|---|
| 7 | 6 | 5 | 4 | 3 | 2 | 1 | 0 |
| OP_CODE | | | BASE_REG | | | SIZE | |

Fig. 15C

| | OP_CODE | BASE_REG | SIZE | OFFSET | Reserved | Operand 1 | Operand 2 |
|---|---|---|---|---|---|---|---|
| 1 | MASK | DIX_BASE | A | 0 | | 0 x ffffffff0000 | 0 x 010203040000 |
| 2 | MASK | DIX_BASE | A | 6 | | 0 x ffffffff0000 | 0 x 090a0b0c0000 |
| 3 | MASK | IP_BASE | L | 12 | | 0 x ffff0000 | 0 x 78020000 |
| 4 | MASK | IP_BASE | L | 16 | | 0 x ffff0000 | 0 x 78020000 |
| 5 | MASK | IP_BASE | B | 1 | | 0 x e0 | 0 x 00 |

FIG. 16A

| | OP_CODE | BASE_REG | SIZE | OFFSET | Reserved | Operand 1 | Operand 2 | Operand 3 |
|---|---|---|---|---|---|---|---|---|
| 1 | BIT | PC_BASE | B | 0 | | Bit MASK 1a | Bit MASK 1b | Bit MASK 1c |
| 2 | BIT | ULP_BASE | L | 0 | | 0 x 0010000 | 0 | 0 x 0000001 |
| 3 | RANGE | PQ_BASE | B | 0 | | 0 x e 0 | 0 x 40 | 0 x e 0 |
| 4 | RANGE | ULP_BASE | W | 0 | | 0 x ffff | 0 x 151 | 151 |
| 5 | RANGE | ULP_BASE | W | 2 | | 0 x ffff | 220 | 250 |

FIG. 16B

METHOD, APPARATUS AND COMPUTER PROGRAM PRODUCT FOR PERFORMING DATA PACKET CLASSIFICATION

BACKGROUND OF THE INVENTION

1. Field of the Invention

The present invention is generally related to communication networks. More particularly, the present invention is related to systems and methods for classifying data packets in a communication network.

2. Background Art

In conventional cable modem systems, a hybrid fiber-coaxial (HFC) network provides a point-to-multipoint topology for supporting data communication between a cable modem termination system (CMTS) at the cable headend and multiple cable modems (CM) at the customer premises. In such systems, information is broadcast downstream from the CMTS to the cable modems as a continuous transmitted signal in accordance with a time division multiplexing (TDM) technique. The upstream transmission of data from the cable modems is managed by the CMTS, which allots to each cable modem specific slots of time within which to transfer data.

Conventional cable modem systems afford considerably less bandwidth on the HFC plant than on the packet switched networks to which they are connected. This lack of bandwidth is further exacerbated by the fact that the HFC channels must be shared by multiple cable modems. As a result, the conservation of HFC bandwidth is imperative in order to maintain overall system performance. This is particularly true where cable modem users are engaging in activities that require both substantial upstream and downstream bandwidth, such as IP telephony, video teleconferencing and Internet gaming.

Conventional cable modem systems utilize DOCSIS-compliant equipment and protocols to carry out the transfer of data packets between multiple cable modems and a CMTS. The term DOCSIS (Data Over Cable System Interface Specification) generally refers to a group of specifications published by CableLabs that define industry standards for cable headend and cable modem equipment. In part, DOCSIS sets forth requirements and objectives for various aspects of cable modem systems including operations support systems, management, data interfaces, as well as network layer, data link layer, and physical layer transport for data over cable systems. The most current version of the DOCSIS specification is DOCSIS 1.1.

Data packets destined for a cable modem system may enter the cable modem system via the CMTS. The CMTS may serve as an interface between the HFC network and a packet-switched network, for example. Thus, the CMTS transfers IP data packets received from cable modems to the packet-switched network or back downstream to another cable modem. Conversely, the CMTS transfers IP data packets received from the packet-switched network to the cable modems on the cable modem system when appropriate.

Cable modem systems typically employ a classification process to classify a target data packet entering the system. The classification process utilizes sets of matching criteria known as classifiers to classify a target data packet. A classifier is applied to each target data packet entering the cable network. As in many networking systems, a cable modem system uses a variety of classification encodings to encode parameters for classifying and scheduling of a target data packet entering the system. For example, in classifying a target data packet entering a cable modem system, a parameter for testing whether the target data packet is of an Internet Protocol (IP) type can be established by defining the parameter to be encoded in a specified format (e.g., type/length/value format).

The principal mechanism for utilizing the classification encodings is to classify packets in the cable modem system into Service Flows. Service Flows are unidirectional flows of packets that are assigned a particular set of classification criteria (i.e., classification parameters). Thus, each Service Flow has a defined set of classification criteria. Service Flows exist in both the upstream and downstream direction. At a minimum, a cable modem must define at least two service flows, one for the upstream direction, and one for the downstream direction. In such a configuration, the upstream Service Flow can describe a default service flow for upstream data traffic which does not necessarily meet any standard defined by the classification criteria set for the service flow. The downstream Service Flow can describe a default service flow for downstream data traffic which does not necessarily meet any standard. The CM and CMTS shape, police, and prioritize data traffic in the cable modem system according to the classification criteria set associated with a particular Service Flow. Thus, each data packet is "matched" to a service flow having the set of classification criteria that are appropriate for the data packet.

The classifier is applied to each incoming data packet (that is, a data packet entering the cable modem system) to determine if the data packet is in compliance with the classification criteria of the classifier. If the data packet complies with the classifier, it is transmitted on the Service Flow associated with that classifier. For example, one member of the classifier can be a classification criteria for a particular destination address. For a data packet to be transmitted on that identified service flow, the data packet must comply with the matching criteria specifying this destination address requirement. If the data packet does not comply with this specification of the matching criteria, it will be transmitted on a default Service Flow.

To determine if the data packet complies with a particular classification criteria in the classifier, a pre-defined field of the data packet (that is, the field of the data packet that is being matched against the requirement specified by the classification criteria) is located before the classification criteria is matched to the pre-defined field of the target data packet. After the pre-defined field is located and the particular classification criteria is matched to the pre-defined field, a second classification criteria can then be applied to a pre-defined field in the data packet. The second classification criteria can access the same or a different pre-defined field of the data packet as the first classification criteria.

Heretofore, the location of a pre-defined field(s) in the data packet had to be determined each time the pre-defined field was accessed for classification purposes, regardless of whether it had been previously located (address offsets of the pre-defined fields in the target data packet are not always at fixed locations). This resulted in a problem of the classification process failing to obtain an optimal execution speed. Thus, the classification process was not as efficient as it could be.

Heretofore, this problem was further exacerbated by serial application of the classification criteria to the pre-defined fields of the data packet. For example, a first matching criteria in the classifier was applied, followed by a second, followed by a third, and so forth, for example. To avoid re-calculating locations of the fields in the target data packet for each of the multiple classifiers, the classification criteria were sometimes re-ordered according to which of the pre-defined fields of the target data packet they needed to access before they were applied to the target data packet. The time devoted to reordering the classification criteria prevented the classification process from obtaining an optimal execution speed.

Accordingly, what is desired is a system and method for classifying a data packet entering a cable modem network offering the following advantages:

(1) eliminating the need to re-locate a pre-defined field of the data packet after it has been previously located;
(2) allowing serial application of the matching criteria to the pre-defined fields of the data packet while providing optimal execution speed of the classification process; and
(3) allowing parallel application of the matching criteria to the pre-defined fields of the data packet while providing optimal execution speed of the classification process.

For example, with regard to application of the matching criteria, the desired system and method should be capable of applying the matching criteria in such a manner as to prevent the application of matching criteria to the data packet if the matching criteria does not relate to the particular type of data packet. Further, the desired system and method should be capable of applying the matching criteria in any order or in a simultaneous manner.

BRIEF SUMMARY OF THE INVENTION

The present invention provides a method for classifying a target data packet entering a network interface. A plurality of classification parameters are received. For each of the plurality of classification parameters, at least one program module is generated. Each program module tests a pre-defined field(s) of the target data packet for adherence to the classification parameter(s) associated with the program module. When a target data packet is received, a pre-classification header is generated, wherein an indication is made of whether one or more pre-defined fields are present in the target data packet. In addition to an indication of presence or absence of the pre-defined field(s), the pre-classification header may also contain a location address or offset (it should be noted that the term address herein should be interpreted as also encompassing an offset) for the one or more pre-defined fields if the one or more pre-defined fields are present in the target data packet. The plurality of program modules can thus utilize the target data packet and the pre-classification header to facilitate an "easy look-up" of the predefined field(s) of the target data packet to test them for adherence to specified values of the classification parameters with which the program modules are associated.

Maintaining locations of the pre-defined fields of the target data packet in the pre-classification header prevents having to re-calculate the addresses or offsets of the pre-defined fields of the target data packet. This allows the classification process of the present invention to obtain an optimal execution speed.

Further, the program modules of the present invention can be executed in any order. Thus, when randomly ordered classification criteria are encountered, the criteria does not have to be reordered. During application of the program modules to the target data packet, each program module can return an individual test result indicating whether the pre-defined field(s) of the target data packet complies with the classification parameter(s) with which the program module is associated. In one embodiment of the present invention, the program modules are applied to the target data packet in a serial manner. In another embodiment, the program modules are applied to the target data packet in a parallel manner. The data packet can then be processed according to a combination of the individual test results of all of the program modules.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention.

FIG. 6A is a diagram illustrating an exemplary pre-classification header with various data fields in accordance with embodiments of the present invention.

FIG. 6B is a diagram illustrating Flag byte 605 of FIG. 6A in accordance with embodiments of the present invention.

FIG. 7A is a diagram illustrating an exemplary target data packet of type 802.1Q.

FIG. 7B is a diagram illustrating an exemplary target data packet of type SNAP.

FIG. 7C is a diagram illustrating an exemplary target data packet of type Non-IP/Non-SNAP LLC 802.2.

FIG. 7D is a diagram illustrating an exemplary target data packet of type IP/SNAP.

FIG. 15A is a diagram illustrating an exemplary primitive for one, two, and four byte operations in accordance with embodiments of the present invention.

FIG. 15B is a diagram illustrating an exemplary primitive for six byte operations in accordance with embodiments of the present invention.

FIG. 15C is a diagram illustrating an exemplary operation code format of a primitive in accordance with embodiments of the present invention.

FIG. 16A is a diagram illustrating exemplary data values of a maximum six-byte format representation of a primitive in accordance with embodiments of the present invention.

FIG. 16B is a diagram illustrating exemplary data values of a maximum four-byte format representation of a primitive in accordance with embodiments of the present invention.

Figure 1:
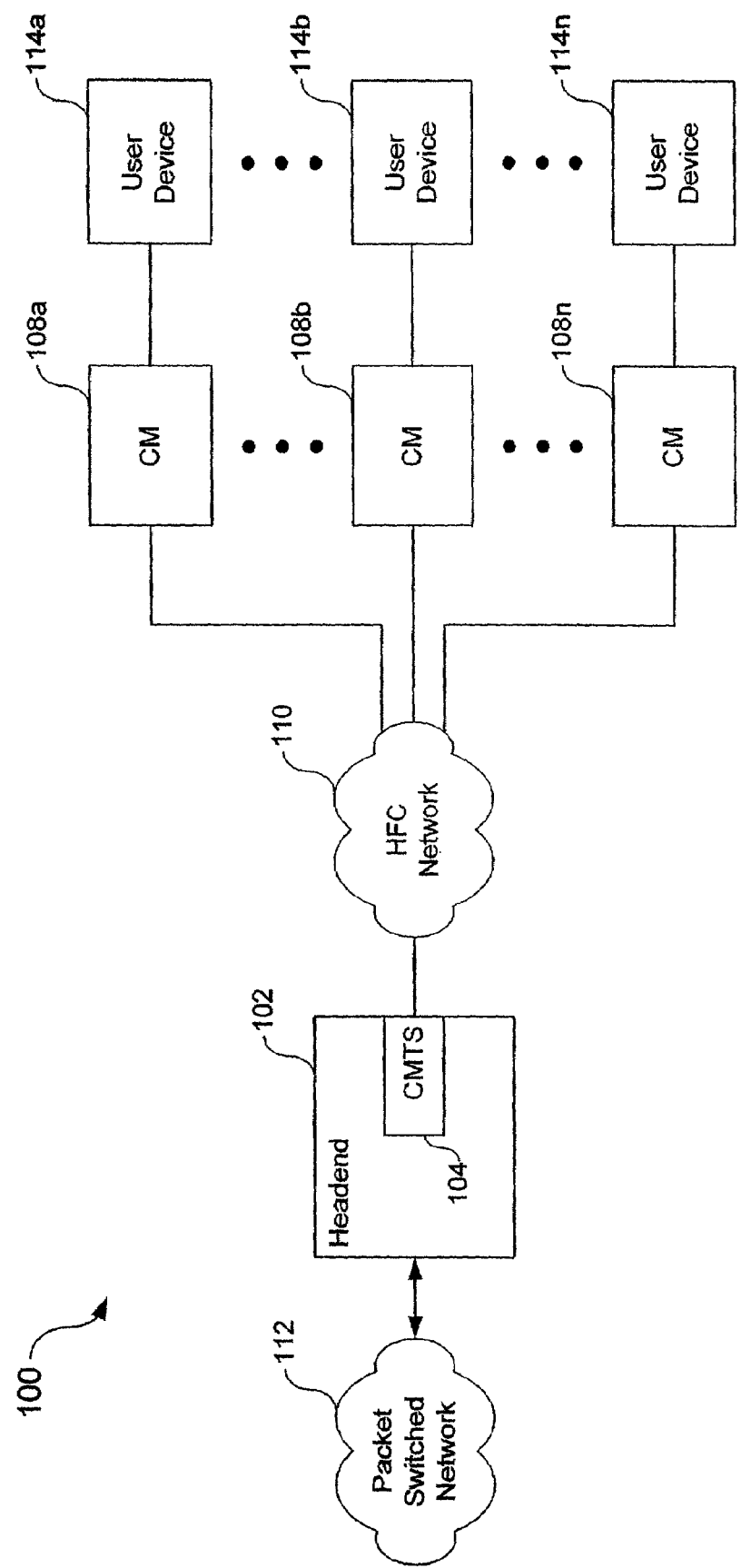
FIG. 1 is a high level block diagram of a cable modem system in accordance with embodiments of the present invention.

The features, objects, and advantages of the present invention will become more apparent from the detailed description set forth below when taken in conjunction with the drawings in which like reference characters and numbers identify corresponding elements throughout. In the drawings, like reference numbers and characters generally indicate identical, functionally similar, and/or structurally similar elements. The drawings in which an element first appears is indicated by the leftmost digit(s) in the corresponding reference number.

DETAILED DESCRIPTION OF THE INVENTION

Table of Contents
A. Exemplary Cable Modem System
B. Conventional Classification Method for a Data Packet Entering a Cable Modem System
C. Classification System and Method for a Data Packet Entering a Cable Modem System in Accordance with Embodiments of the Present Invention
D. Environment of the Present Invention
E. Conclusion While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

A. Exemplary Cable Modem System

FIG. 1 is a high level block diagram of an exemplary cable modem system 100 in accordance with embodiments of the present invention. The cable modem system 100 enables voice communications, video and data services based on a bi-directional transfer of packet-based traffic, such as IP traffic, between a cable system headend 102 and a plurality of cable modems over a hybrid fiber-coaxial (HFC) cable network 110. In the example cable modem system 100, only three cable modems 108a, 108b, and 108n are shown for clarity. In general, any number of cable modems may be included in the cable modem system of the present invention.

The cable headend 102 is comprised of at least one cable modem termination system (CMTS) 104. The CMTS 104 is the portion of the cable headend 102 that manages the upstream and downstream transfer of data between the cable headend 102 and the cable modems 108. The CMTS 104 broadcasts information downstream to the cable modems 108 as a continuous transmitted signal in accordance with a time division multiplexing (TDM) technique. Additionally, the CMTS 104 controls the upstream transmission of data from the cable modems 108 to itself by assigning to each cable modem 108 short grants of time within which to transfer data. In accordance with this time domain multiple access (TDMA) technique, each cable modem 108 may only send information upstream as short burst signals during a transmission opportunity allocated to it by the CMTS 104.

As shown in FIG. 1, the CMTS 104 further serves as an interface between the HFC network 110 and a packet-switched network 112, transferring IP packets received from the cable modems 108 to the packet-switched network 112 and transferring IP packets received from the packet-switched network 112 to the cable modems 108 when appropriate. In embodiments, the packet-switched network 112 comprises the Internet.

In addition to the CMTS 104, the cable headend 102 may also include one or more Internet routers to facilitate the connection between the CMTS 104 and the packet-switched network 112, as well as one or more servers for performing necessary network management tasks.

The HFC network 110 provides a point-to-multipoint topology for the high-speed, reliable, and secure transport of data between the cable headend 102 and the cable modems 108. As will be appreciated by persons skilled in the relevant art(s), the HFC network 110 may comprise coaxial cable, fiberoptic cable, or a combination of coaxial cable and fiberoptic cable linked via one or more fiber nodes.

Each of the cable modems 108 operates as an interface between the HFC network 110 and at least one attached user device. In particular, the cable modems 108 perform the functions necessary to convert downstream signals received over the HFC network 110 into data packets for receipt by an attached user device. Additionally, the cable modems 108 perform the functions necessary to convert data packets received from the attached user devices into upstream burst signals suitable for transfer over the HFC network 110. In the example cable modem system 100, each cable modem 108 is shown supporting only a single user device for clarity. For example, cable modem 108a supports user device 114a, cable modem 108b supports user device 114b, cable modem 108n supports user device 114n, and so forth. In general, each cable modem 108 is capable of supporting a plurality of user devices for communication over the cable modem system 100. User devices may include personal computers, data terminal equipment, telephony devices, broadband media players, network-controlled appliances, or any other device capable of transmitting or receiving data over a packet-switched network.

In the example cable modem system 100, cable modems 108 represent conventional DOCSIS-compliant cable modems. In other words, cable modems 108 transmit data packets to the CMTS 104 in formats that adhere to the protocols set forth in the DOCSIS specification. Furthermore, in the example cable modem system 100, the CMTS 104 operates to receive and process data packets transmitted to it in accordance with the protocols set forth in the DOCSIS specification. However, in accordance with embodiments of the present invention, the cable modems 108 and the CMTS 104 may operate to receive and process data packets that are formatted using proprietary protocols that differ from those provided by the DOCSIS specification.

Figure 2:
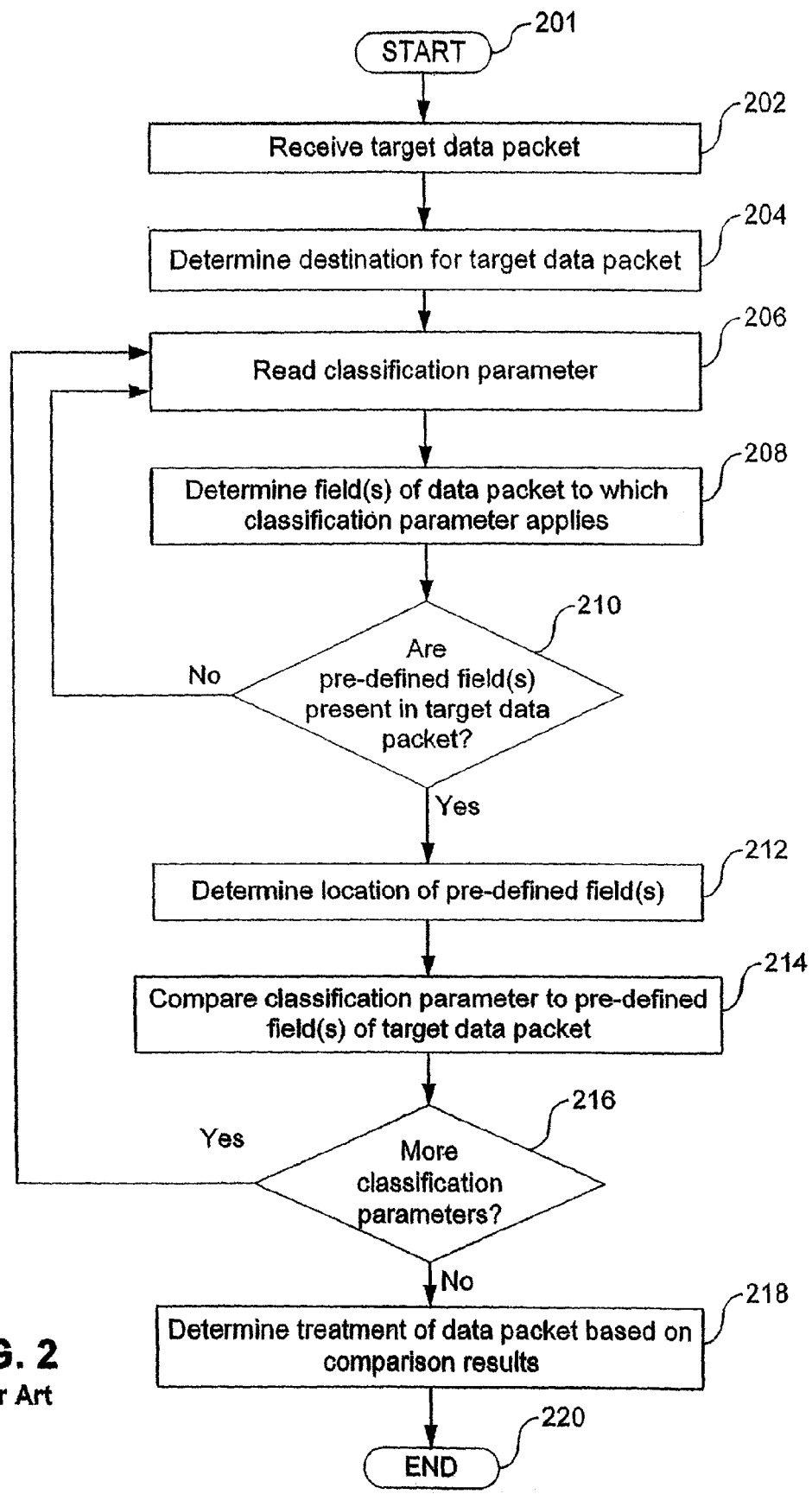
FIG. 2 is a flow diagram of a conventional method for classifying a data packet entering a cable modem system.

B. Conventional Classification Method for a Data Packet Entering a Cable Modem System FIG. 2 depicts a flow diagram of a conventional method for classifying a data packet traveling from the packet switched network 112 via the CMTS 104 to the HFC Network 110. More specifically, FIG. 2 depicts a flow diagram of a conventional method for classifying a data packet traveling from the packet switched network 112 to one of the cable modems 108 on the HFC network 110.

Referring now to FIG. 2, the process begins with step 201 and proceeds immediately to step 202. In step 202, the CMTS 104 receives a target data packet (i.e., a data packet that will undergo classification) from the packet-switched network 112, for example. The process then proceeds to step 204.

In step 204, the destination for the target data packet can be determined. For example, a header in the target data packet can be examined and a determination made that the target data packet is destined for one of the cable modems 108. In another implementation of the present invention, the destination is not determined prior to classification. The process then proceeds to step 206.

In step 206, a classification parameter is read. For example, the classification parameter may be one of a group of classification parameters included in a CM configuration file which is forwarded by the CM to the CMTS as part of its Registration Request. An example of a classification parameter is a specific destination IP address. Such a classification parameter may be conveyed using a specific format such as type/length/value format. A group of classification parameters combine to form a classifier. The process then proceeds to step 208.

In step 208, the pre-defined field(s) of the data packet to which the classification parameter of step 208 applies are determined. For example, if the classification parameter is a value specifying a destination IP address required by the target data packet, the pre-defined field(s) of the target data packet is its destination IP address field. The process then proceeds to decision step 210.

In decision step 210, it is determined whether the pre-defined field(s) is actually present in the target data packet. Continuing with the above-referenced example, the target data packet is examined to detect whether it contains a destination IP address field. If the pre-defined field(s) is not actually present in the target data packet, then the process returns to step 206, wherein the next classification parameter is read. The process then again proceeds to step 208 where the pre-defined field(s) of the target data packet for the most recently read classification parameter is determined.

Returning to decision step 210, if the pre-defined field(s) is present in the target data packet, the process then proceeds to step 212.

Before the classification parameters can be applied to the value stored in the pre-defined field(s) of the target data packet, the pre-defined field(s) must first be located as shown in step 212. Referring again to the destination IP address example discussed above, the location of the destination IP address field of the data packet is determined. Once the location of the pre-defined field(s) in the target data packet is known, the classification parameter can be applied to the target data packet to test the target data packet for compliance with the classification parameter. In an implementation of the present invention, the steps described in steps 210 and 212 occur in one single step. The process then proceeds to step 214.

In step 214, the classification parameter is applied. In the example offered above, the classification parameter specifies the destination IP address required of the target data packet to allow it to be transmitted on a particular service flow. This specified value of the classification parameter is tested against the value stored in the destination IP address field of the target data packet (i.e., the pre-defined field of the target data packet). The process then proceeds to decision step 216.

In decision step 216, it is determined whether there are more classification parameters in the classifier to be applied to the target data packet. If there are more classification parameters to be applied to the target data packet, then the process returns to step 206, wherein the next classification parameter is read, and steps 208-214 are executed for that particular classification parameter.

Returning to decision step 216, if there are no more classification parameters to be read, the process proceeds to step 218.

In step 218, it is determined how to treat the target data packet based on the results of the comparison of the classification parameters with the pre-defined field(s) of the target data packet. For example, if it is determined that the target data packet complies with the classification parameters associated with a particular service flow, then the target data packet can be transmitted on the particular service flow. Alternatively, if it is determined that the target data packet failed to comply with the classification parameters associated with the particular service flow, then the target data packet may be transmitted on a pre-determined default service flow.

One problem with the approach depicted in FIG. 2 is that after a field is located in the data packet, it must be re-located if it needs to be accessed again. Another problem with the approach depicted in FIG. 2 is that unnecessary testing of the fields of the data packet can occur. For example, although a data packet may not be an IP data packet, testing to determine if the data packet's source IP address is a certain value occurs. Such testing is unnecessary because a non-IP data packet does not have a source IP address. Both of the disadvantages discussed above prevent the method depicted in FIG. 2 from obtaining an optimal execution speed.

Finally, the process ends with step 220.

Figure 3:
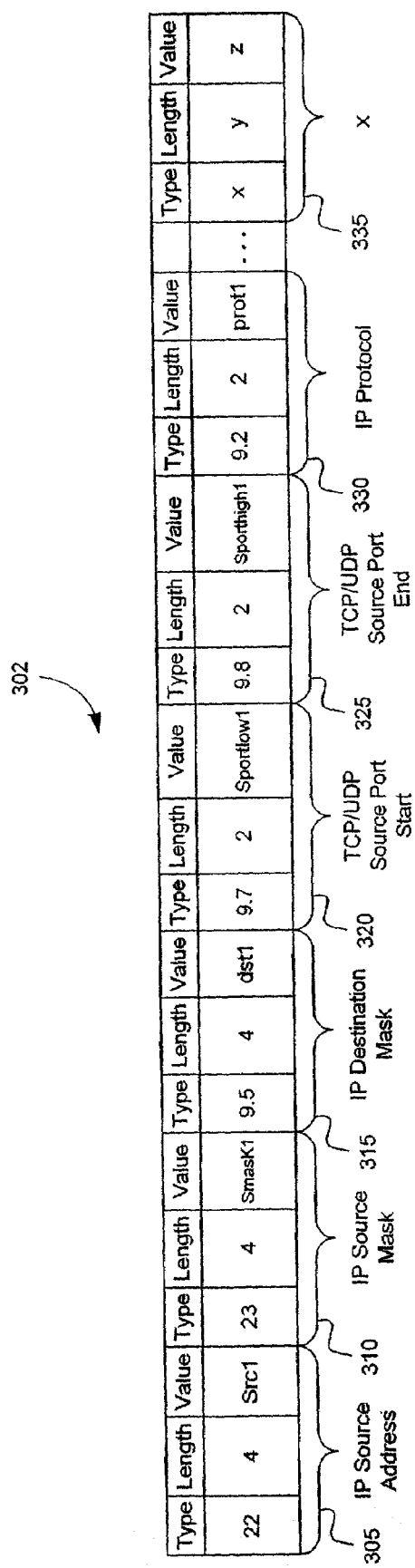
FIG. 3 is a block diagram of an exemplary set of classification criteria encoding.

FIG. 3 illustrates an exemplary set of classification criteria encodings 302. The classification criteria encodings 302 depicted in FIG. 3 are all IP Packet Classification Encodings. These encodings specify matching criteria (i.e., classification parameter values) which are applied to the target data packet, as described above. The classification criteria encodings 302 may be stored in a CM configuration file, for example, which may be forwarded to the CMTS in a registration request.

The set of classification criteria encodings 302 is comprised of IP Source Address encoding 305, IP Source Mask encoding 310, IP Destination Mask encoding 315, Transmission Control Protocol/User Datagram Protocol (TCP/UDP) Source Port Start encoding 320, TCP/UDP Source Port End encoding 325, and IP Protocol encoding 330, and so forth. Each of the encodings 305, 310, 315, 320, 325, 330, and 335 includes a type field, length field, and a value field. Each of the encodings 305, 310, 315, 320, 325, 330, and 335 are well known to those skilled in the art. Thus, they will not be discussed further herein.

Figure 4:
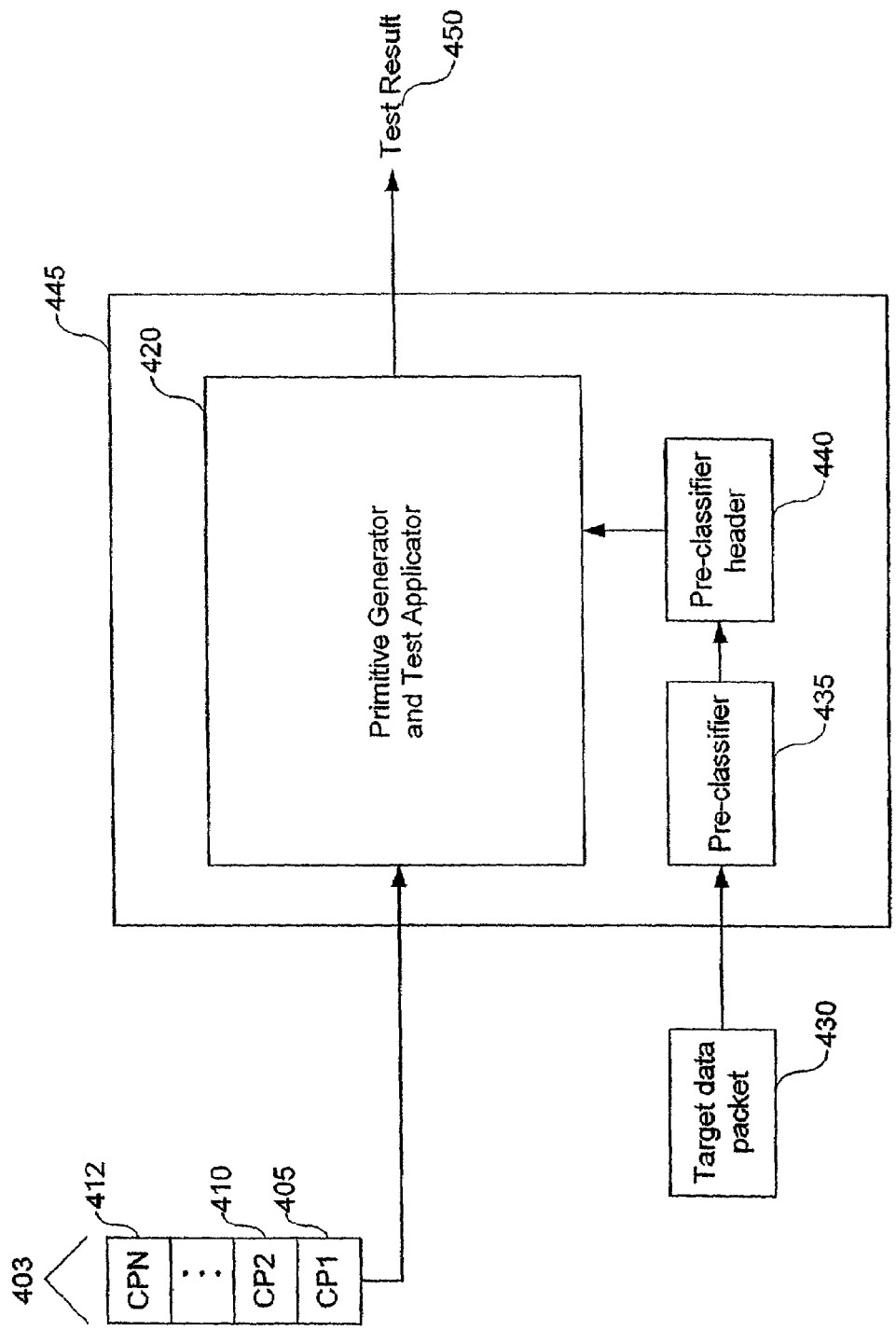
FIG. 4 is a block diagram of a classification system in a cable modem system in accordance with embodiments of the present invention.

C. Classification System and Method for a Data Packet Entering a Cable Modem System in Accordance with Embodiments of the Present Invention FIG. 4 illustrates a classification system 445 in a cable modem system in accordance with embodiments of the present invention. A person skilled in the relevant art(s) will recognize that other configurations and arrangements can be used without departing from the spirit and scope of the present invention.

The classification system 445 can classify a target data packet 430 being transmitted from the packet switched network 112, for example, to the HFC network 110 via the CMTS 104. An overview of the operation of the classification system 445 will now be provided. The various components of the system will be further described in subsequent figures.

The classification system 445 comprises software components primitive generator and test applicator 420, pre-classifier 435, and pre-classifier header 440. The classification system 445 receives as input classification parameters 403. In addition, the classification system 445 receives as input target data packet 430. The classification system 445 produces test result 450 as output.

The classification system 445 applies the classification parameters 403 to pre-defined field(s) of the target data packet 430, to determine whether the target data packet 430 is in compliance with the classification parameters 403. As will be discussed below, the classification parameters 403 may be associated with the a service flow on which the target data packet 430 will travel.

Primitive generator and test applicator 420 generates primitives (i.e., program modules) which are based on the classification parameters 403. The generated primitives (not shown in FIG. 4) are used to test the target data packet for compliance with the classification parameters 403 with which the primitives are associated. Operation of the primitive generator and test applicator will be described in more detail below with reference to subsequent figures.

Pre-classifier 435 receives as input target data packet 430 in preparation for classifying the target data packet 430. The target data packet 430 includes various fields containing various stored values. The pre-classifier 435 examines the target data packet 430 to identify various pre-defined field(s) in the target data packet 430 and calculates addresses or offsets of the various pre-defined field(s) in the target data packet 430. This pre-identification and address calculation prevents the classification system 445 from having to later re-calculate the addresses of the various fields in the data packet 430 during each testing step of the classification process. Thus, execution speed of the classification system is greatly enhanced, and efficiency is improved.

The pre-classifier 435 stores the various fields in a pre-classifier header 440 for later access by the primitive generator and test applicator 420, as will be described below. In an embodiment, the pre-classifier header 440 is concatenated to the target data packet 430 by the pre-classifier 435.

The pre-classifier header 440 comprises flags indicating whether the pre-defined field(s) of the target data packet are present in the target data packet. The pre-classifier header 440 also comprises values indicating the location of the pre-defined field(s) in the target data packet. The pre-classifier header 440 thus facilitates "easy lookup" of the pre-defined field(s) of the target data packet which aids in allowing the classification process to achieve improved efficiency.

The classification parameters 403 comprise classification parameter 405, classification parameter 410, and classification parameter 412, each specifying a value with which the target data packet must comply. Each one of classification parameters 403 will ultimately be applied against one or more pre-defined field(s) of the target data packet 430 by at least one associated primitive. The primitive execution determines compliance of the target data packet with the value specified by the particular classification parameter with which the primitive is associated. The relationship between primitives and classification parameters can be one-to-many, one-to-one, or many-to-one. For example, one primitive can be generated for testing the target data packet for adherence to a plurality of classification parameters. Similarly, one primitive can be generated for testing the target data packet for adherence to only one classification parameter. Further still, many primitives can be generated for testing the target data packet for adherence to one classification parameter.

In an embodiment, the target data packet 430 is a data packet entering the HFC network 110 via headend 102 (shown in FIG. 100).

The test result 450 is the result produced by primitive generator and test applicator 420. The test result 450 is used to determine how to treat the target data packet 430. For instance, based on the test result 450, a determination could be made to transmit the target data packet 430 on a particular service flow. All primitives generated by primitive generator and test applicator 420 may return indications that the target data packet 430 complies with the specifications of their associated classification parameters. In this situation, the test result 450 can indicate that the target data packet 430 is in compliance with the values specified by the totality of the classification parameters with which the primitives are associated. Thus, the target data packet can be transmitted on the particular service flow in this situation.

Figure 5:
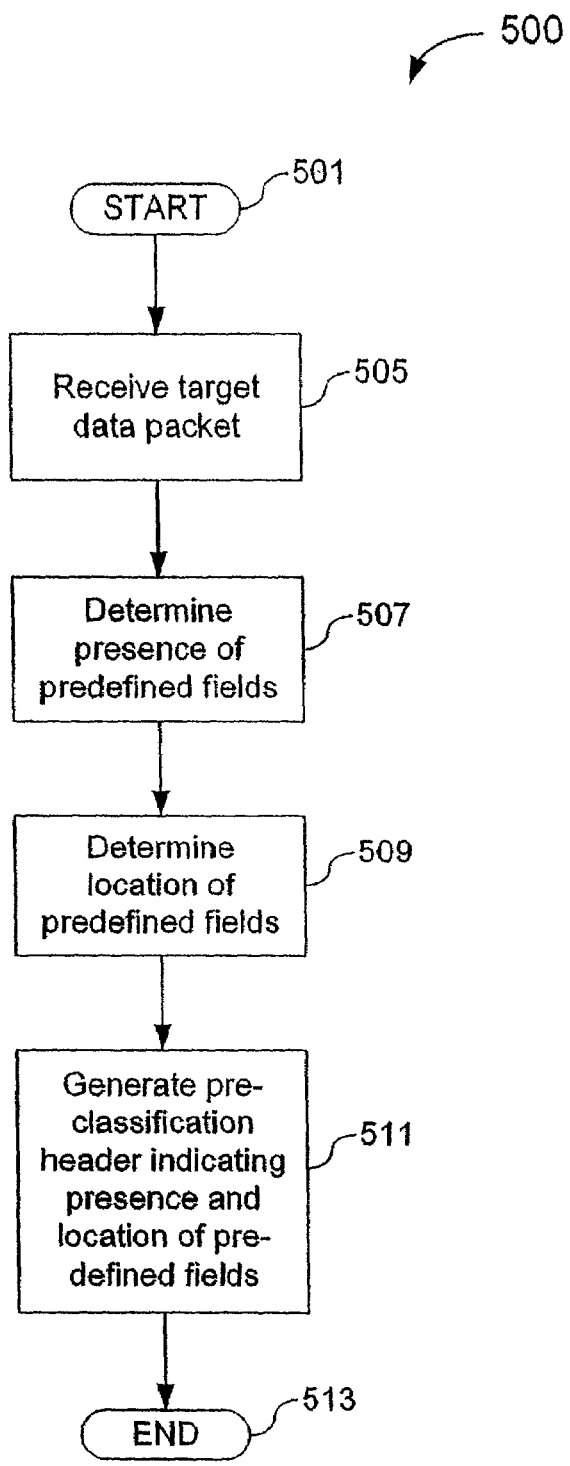
FIG. 5 is a high-level flow diagram illustrating a method for pre-classifying a data packet in a cable modem system in accordance with embodiments of the present invention.

FIG. 5 is a flow diagram illustrating a method for pre-classifying a target data packet according to embodiments of the present invention. The invention is not limited to the description provided herein with respect to flow diagram 500. Rather, it will be apparent to persons skilled in the relevant art(s) after reading the teachings provided herein that other functional flow diagrams are within the scope of the present invention. The process begins with step 501, and immediately proceeds to step 505.

In step 505, the CMTS 104 receives a target data packet (a data packet that will undergo classification) from the packet-switched network 112, for example. The process then proceeds to step 507.

In step 507, it is determined whether certain pre-defined field(s) (i.e., the field specified by a classification parameter) of the target data packet is present. For example, if the classification parameter is a value specifying a particular destination IP address, a determination is made of whether the target data packet contains a destination IP address field. The process then proceeds to step 509.

In step 509, a location of the pre-defined field(s) of the target data packet is determined. Continuing with the above-referenced example, the address of the IP destination address field of the target data packet is calculated. The process then proceeds to step 511.

In step 511, a pre-classification header indicating presence and location of pre-defined field(s) of the target data packet is generated. The pre-classification header allows for "easy lookup" of the pre-defined fields of the target data packet. As mentioned in FIG. 4, the use of a pre-classification header results in increased efficiency of the classification process. The pre-classification header will be described in more detail in FIG. 6. Finally, control proceeds to step 513, where the process ends.

FIG. 6A is a diagram illustrating an exemplary Ethernet pre-classification header with various data fields in accordance with embodiments of the present invention. The pre-classification header enables the classification process to obtain optimal execution speed in classifying a target data packet. The addresses of the pre-defined fields in the target data packet are calculated if the pre-defined fields are identified in the pre-classification header as being present in the data packet. Addresses may be defined in terms of an exact position within the target data packet, or in terms of a position plus an offset. Thus, the need of having to re-calculate the addresses of the pre-defined fields of the target data packet each time the pre-defined fields are accessed during the classification process is avoided. As a result of eliminating the requirement of re-calculating the addresses of the pre-defined fields, optimal execution speed of the classification process is obtained. The content of the pre-classification header will be further discussed below.

Referring to FIG. 6A, the pre-classification header comprises flag byte 605, DIX_Base offset 610, TL_Base offset 615, PQ_Base offset 625, IP_Base offset 630, ULP_Base offset 635, reserved fields 620*a* and 620*b*, and field 621 which may contain other appropriate pre-classification information. In addition, field 645 can contain the packet Protocol Data Unit (PDU).

The flag byte 605 identifies types of protocols which have been identified as being present in the target data packet. In one embodiment, the pre-classification header flag byte also indicates the pre-classification "type" and the presence and/or types of protocols within the target data packet. The flag byte 605 will be described in greater detail with reference to FIG. 6B.

In the example depicted in FIG. 6A, fields 610, 615, 625, 630, and 635 contain location address offsets for each protocol identified by the flag byte 605. For example, the field 610 contains the offset value for the address at which an Ethernet header is located. The field 615 contains the offset value for the address at which the Ethernet type/length word is located. The field 625 contains the offset value for the address at which an 802.1 Tag Control Information (TCI) word is located. The field 630 contains the address of the first byte of the IP header. The field 635 contains the offset value for the address at which the first byte of the next higher level protocol (e.g., User Datagram Protocol (UDP) or TCP) is located.

FIG. 6B is a diagram illustrating the contents of the flag byte 605 of FIG. 6A. FIG. 6B comprises LLC flag bit 650, SNAP flag bit 655, PQ flag bit 660, IP flag bit 665, TCP flag bit 670, UDP flag bit 675, and reserved bits 680. In FIG. 6B, each of the flag bits 650, 655, 660, 665, 670, and 675 indicate whether a particular type of protocol is present in the target data packet. For example, if the most significant bit is set (i.e., field 650), this is an indication that the 802.2 Logical Link Control (LLC) protocol is present in the target data packet. Further, each bit may indicate the validity of one of the Base values discussed in FIG. 6A. For example, if the IP bit is set in FIG. 6B, this is an indication that the IP_Base value is valid.

FIGS. 7A, 7B, 7C, and 7D illustrate exemplary target data packets entering the cable modem system 100 of the present invention. The target data packets 700A, 700B, 700C, and 700D may be pre-classified according to embodiments of the present invention. Each of the target data packets represents a different type of data packet. The target data packet 700A is of the type 802.1Q. The target data packet 700B is of the type Simple Network Access Protocol (SNAP). The target data packet 700C is of the type Non-IP/Non-SNAP/LLC. The target data packets 700D is of the type IP/SNAP. The target data packets 700A, 700B, 700C, and 700D will be referenced throughout FIG. 8 to illustrate the pre-classification method according to an embodiment of the present invention.

Figure 8:
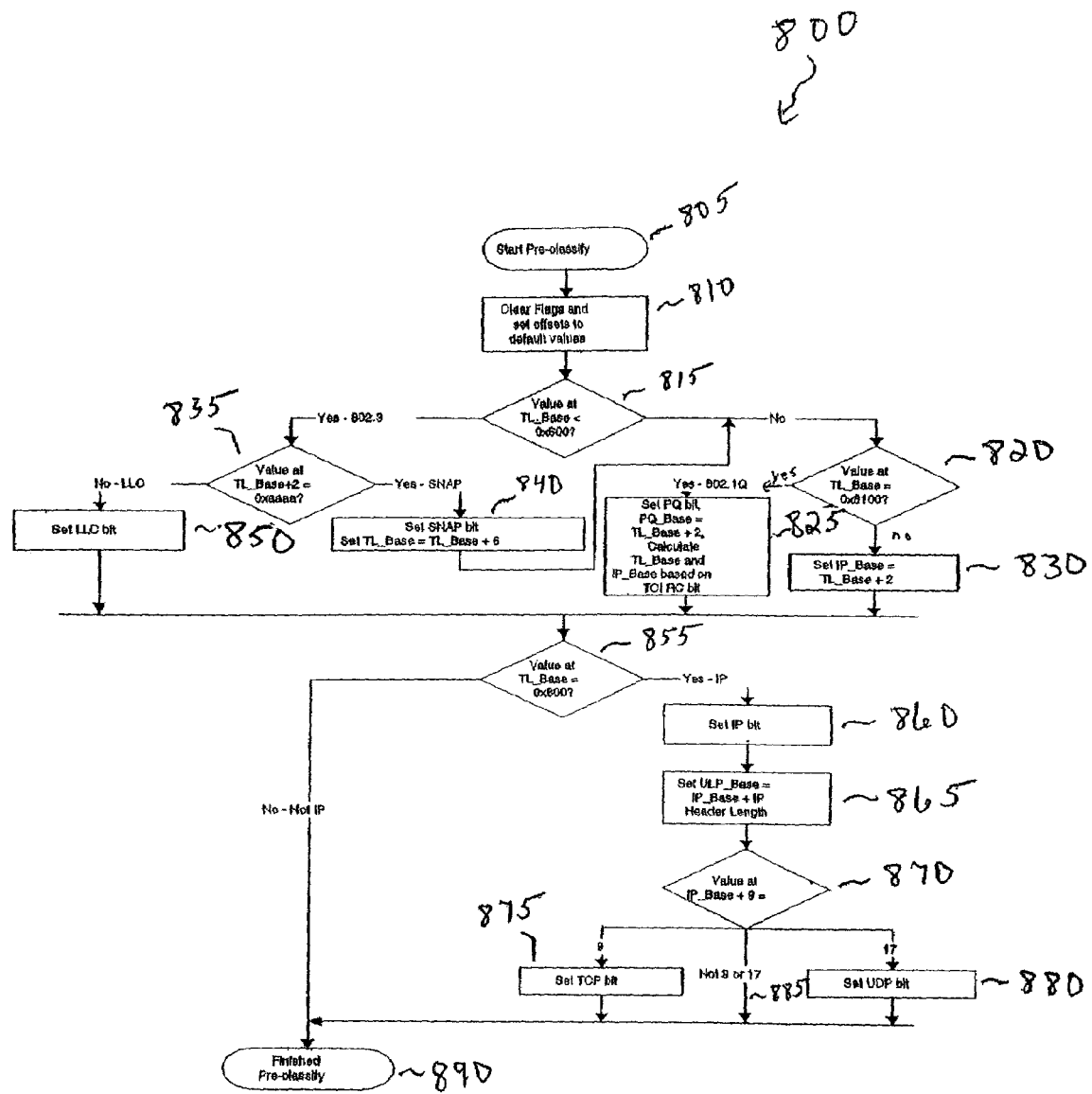
FIG. 8 is a flow diagram illustrating a method for pre-classifying the exemplary target data packets of FIG. 7 in accordance with an embodiment of the present invention.

FIG. 8 depicts a flowchart 800 of a method for pre-classifying the exemplary target data packets 700A, 700B, 700C, and 700D entering the cable modem system 100 in accordance with a specific embodiment of the present invention. The present invention, however, is not limited to the description provided by the flowchart 800 or the target data packets of FIG. 7. Rather, it will be apparent to persons skilled in the relevant art(s) from the teachings provided herein that other functional flows and target data packets are within the scope and spirit of the present invention. The flowchart 800 will be described with continued reference to the exemplary target data packets of FIG. 7.

The pre-classification process begins with step 805 and proceeds immediately to step 810. In step 810, the flags in the pre-classification header indicating the presence of particular protocols are all cleared. The offset values of the flags are set to their default values. For example, as discussed in FIG. 6A, the default value for the DIX_Base field (DIX_Base contains the offset value for the address at which the first byte of an LLC header can be located, or it can contain the offset value for the address at which the first byte of a SNAP header can be located) can be zero, indicating that it represents the top of an exemplary target data packet. Similarly, the default value for the TL_Base value can be twelve because this is where the type/length value of an 802 protocol type packet is located. The default values for the other flags are "off," and their offset values are undefined. The process then proceeds to decision step 815.

In decision step 815, a determination is made of whether the value at the Ethernet type/length field TL_Base (i.e., Type/Len field of the target data packets of FIG. 7) is less than 600H. If the value at TL_Base is equal to or greater than the value 600H, then the type/length field defines a protocol. If the value at TL_Base is less than 600H, then the type/length field defines a length.

For example, the Ethernet type/length field at TL_Base of exemplary target data packet 700A of FIG. 7A is not less than 600H (i.e., the value is 8100H, which is greater than or equal to 600H). Thus, control in this case proceeds to decision step 820.

In decision step 820, it is determined whether the value at TL_Base is equal to 8100H. For example, the type/length field of target data packet 700A at TL_Base is equal to 8100H. Thus, target data packet 700A is of the type 802.1 P/Q. Control then proceeds to step 825, where the PQ bit is set, the value in PQ_Base is set to the value located two bytes from the value in TL_Base, and TL_Base and IP_Base are calculated based on the Tag Control Information and Route Control bits within the 802.1 P/Q header field.

Returning to decision step 820, if it is determined that the type/length field of the exemplary target data packet is not equal to 8100H, then the value at IP_Base is set to the value located two bytes from the value at TL_Base.

Returning to decision step 815, if the value at TL_Base is less than 600H, then the target data packet is some type of 802.3 data packet. For example, the value stored in the type/length field at TL_Base of exemplary target data packet 700B is 72H, which is less than 600H. Thus, the target data packet 700B is some type of 802.3 data packet and control in this case proceeds to decision step 835.

In decision step 835, it is determined whether the value at the first field directly following the 2-byte type length field value (i.e., the first field of the LLC header) is equal to the value aaaaH.

If the first field of the LLC header is equal to the value aaaaH, then the target data packet is of the type SNAP. For example, DSAP/SSAP/Ctl of target data packet 700B contains a value of aaaa (in hexadecimal notation). Thus, the target data packet 700B is of the type SNAP. Control then proceeds to step 735, where the SNAP bit is set in the pre-classification header, and the value in TL_Base is set to the value located six bytes from the TL_Base field. Control then proceeds to decision step 820, where a determination is made to proceed to step 825 or step 830, as already described above.

Returning to decision step 835, if the value located two bytes from TL_Base is not equal to the value aaaa (the Source and Destination Service Access Point (SSAP and DSAP) are being examined), then the target data packet is of the LLC type. For example, target data packet 700C is of type Non-IP/Non-SNAP LLC 802.2. Control then proceeds to step 850, where the LLC bit is set in the pre-classification header, as described in FIGS. 6A and 6B.

Control then proceeds to decision step 855. In decision step 855, it is determined whether the value at TL_Base is equal to 800H. For example, the TL_Base field of the exemplary target data packet 700D is equal to the value 800H. Thus, it is an exemplary target data packet of type IP. Control in this case then proceeds to step 860. In step 860, the IP bit in the pre-classification header is set. Alternatively, in decision step 855, if the value at TL_Base is not equal to 800H, the target data packet is not of the IP type, and control in this case proceeds to step 890, where the pre-classification process ends.

In step 865, the beginning of the upper level protocol data is located. In decision step 870, the IP protocol type is determined. If the value located nine bytes from the IP_Base value is equal to the value nine (decimal), the Transmission Control Protocol (TCP) bit is set in the pre-classification header. If the value located nine bytes from the IP_Base value is equal to the value seventeen (decimal), the User Datagram Protocol (UDP) bit is set in the pre-classification header. If the value located nine bytes from the IP_Base value is a value other than nine or seventeen (step 885), then the IP protocol type being determined is not TCP and not UDP (perhaps, Hypertext Transfer Protocol (HTTP), for example). Finally, control ends with step 890.

Figure 9:
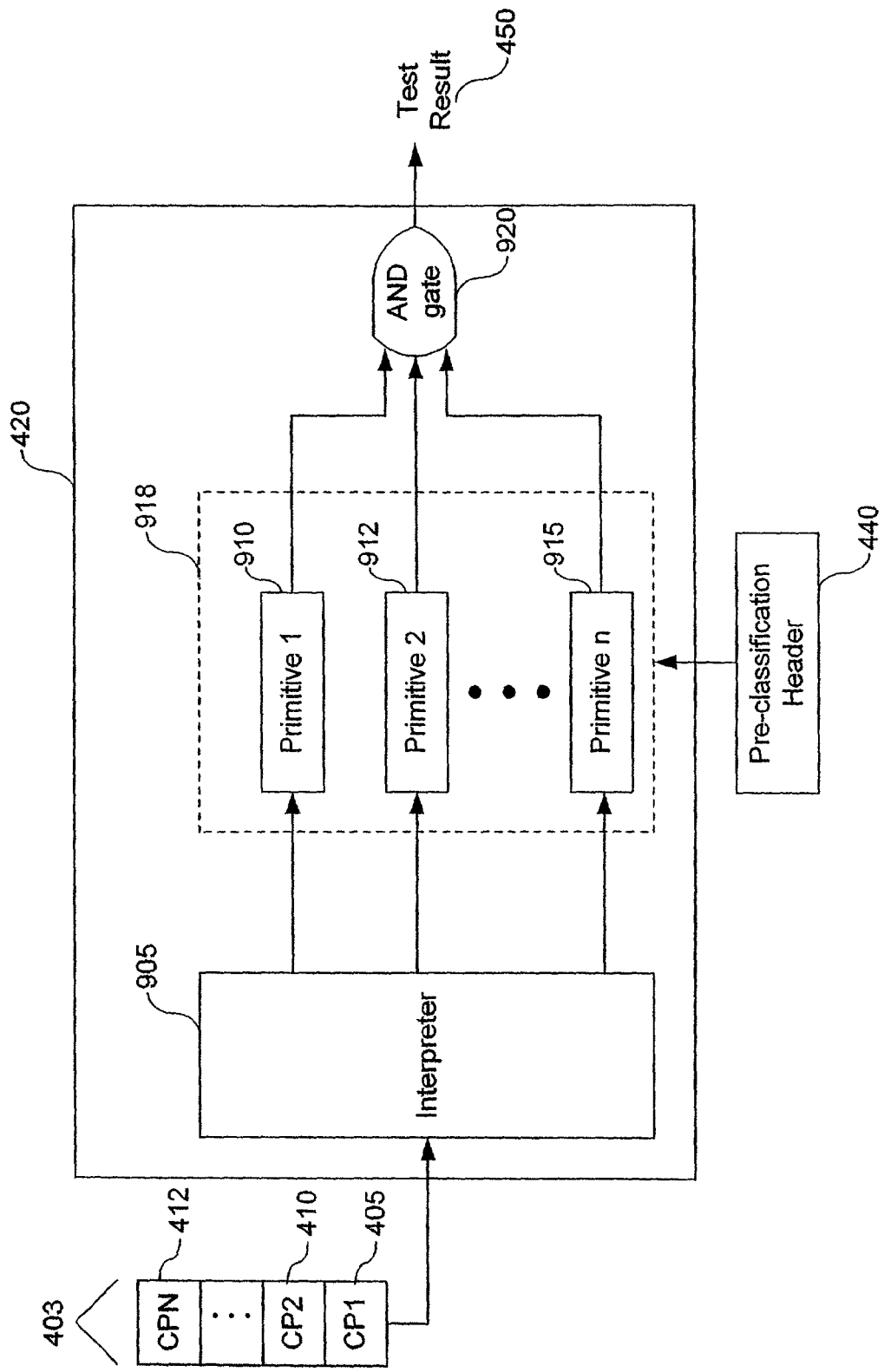
FIG. 9 is a block diagram illustrating the primitive generator and parallel test applicator of FIG. 4 in accordance with embodiments of the present invention.

FIG. 9 illustrates the primitive generator and test applicator 420 of FIG. 4 in accordance with an embodiment of the present invention in which the primitives are applied to the target data packet in a parallel manner. The primitive generator and test applicator 420 comprises interpreter 905, primitives 910, 912, 915, and AND gate 920. Classification parameters 403 and pre-classification header 440 serve as inputs to the primitive generator and test applicator 420. Primitive generator and test applicator 420 produces test result 450.

Interpreter 905 receives classification parameters 403. For each one of the classification parameters 403, the interpreter 905 generates at least one of the primitives 918, which is associated with at least one of the classification parameters 403. Each one of the associated primitives 918 is applied to the target data packet to test it for adherence to the standard of at least one of the classification parameters 403 with which the primitive is associated.

For example, the interpreter 905 may receive classification parameter 405 and generate primitive 910 for testing the target data packet for adherence to the standards as defined by the classification parameter 405. Likewise, the interpreter 905 may receive the classification parameter 410 and generate the primitive 912 for testing the target data packet for adherence to the standard as defined by the classification parameter 410. Similarly, the interpreter 905 may receive the classification parameters 405, 410, and 412 and generate the primitive 910, for example. In this situation, the primitive 910 tests the target data packet for adherence to the classification parameters 405, 410, and 412. Further still, the interpreter 905 may receive the classification parameter 405, for example, and generate the primitives 910, 912, and 915 to test the target data packet for adherence to the classification parameters 405, 410, and 412, with which the primitive 910 is associated. In this situation, the primitives 910, 912, and 915 are all based on the classification parameter 405.

In the embodiment shown in FIG. 9, after all associated primitives 918 are generated for their respective classification parameter(s) 403, they are applied to the pre-defined fields of the target data packet in a parallel manner such that execution of each of the primitives is contemporaneous with execution of each of the other primitives. Unlike a serial application approach, the parallel application approach depicted in FIG. 9 offers the advantage of not having to reorder the classification criteria. This allows the classification process of the present invention to obtain an optimal execution speed.

By contrast, in a serial application of the classification criteria to the pre-defined fields of the data packet, a first matching criteria in the classifier is applied, followed by a second, followed by a third, and so forth. To avoid re-calculating locations of the fields in the target data packet for each of the multiple classifiers, the classification criteria were sometimes re-ordered according to which of the pre-defined fields of the target data packet they needed to access before they were applied to the target data packet. The time devoted to reordering the classification criteria in the serial approach prevented the classification process from obtaining an optimal execution speed.

To aid in obtaining maximum execution speed of the classification process, primitives 918 are provided with access to pre-classification header 440. As described with reference to FIG. 6, the pre-classification header 440 contains an indication of whether a particular pre-defined field is present in the target data packet and the location of the pre-defined field (i.e., an address for the pre-defined field).

When primitive 910 accesses the pre-defined field of the target data packet, as specified by its associated classification parameter 405, it needs to first locate the pre-defined field in the data packet. Thus, the primitive 910 accesses the pre-classification header to locate the pre-defined field of the data packet, as specified by the primitive's associated classification parameter (e.g., classification parameter 405). After locating the pre-defined field of the target data packet, the primitive is applied to the field of the target data packet to test it for compliance with the standard specified by the classification parameter(s) with which the primitive is associated. Likewise, all primitives 918 are applied to the pre-defined fields of the target data packet to test them for compliance with the standards specified by the classification parameters with which the primitives are associated.

In the embodiment shown in FIG. 9, in response to their application to the target data packet, each primitive generates an individual test result (not shown). The individual result of each primitive is provided to AND gate 920. The AND gate 920 returns the test result 450, based on the individual test results of each primitive. For example, if primitive 910 detects that the target data packet passes its test, it returns an individual test result of "true." If primitive 912 detects that the target data packet passes its test, it returns an individual test result of "true." If primitive 915 detects that the target data packet does not pass its test (i.e., the target data packet fails its test), it returns an individual test result of "false." Thus, in accordance with this example, the AND gate 920 is provided with values of "true," "true," and "false" (i.e., the individual test results of each primitive). As a result, the AND gate 920 returns the test result 450, having a value of "false."

Based on the test result 450, a determination can be made as to how to process the target data packet. For example, the test result 450 may indicate an action such as payload header suppression. Alternatively, the test result 450 may determine an action such as transmission of the target data packet on a particular service flow. It should be understood that the above-reference actions are exemplary and should not be construed as limiting the scope or spirit of the invention. It will be apparent to persons skilled in the relevant art(s) after reading the teachings provided herein that other actions are within the scope and spirit of the present invention. For instance, if the test result 450 is "false," a determination may be made to transmit the target data packet on a default service flow (i.e., a service flow other than that identified by the group of classification parameters which provided the testing criteria). On the other hand, if the test result 450 is "true," a determination may be made to send the target data packet on the service flow identified by the group of classification parameters which provided the testing criteria. In addition, a payload suppression index may be returned.

Figure 10:
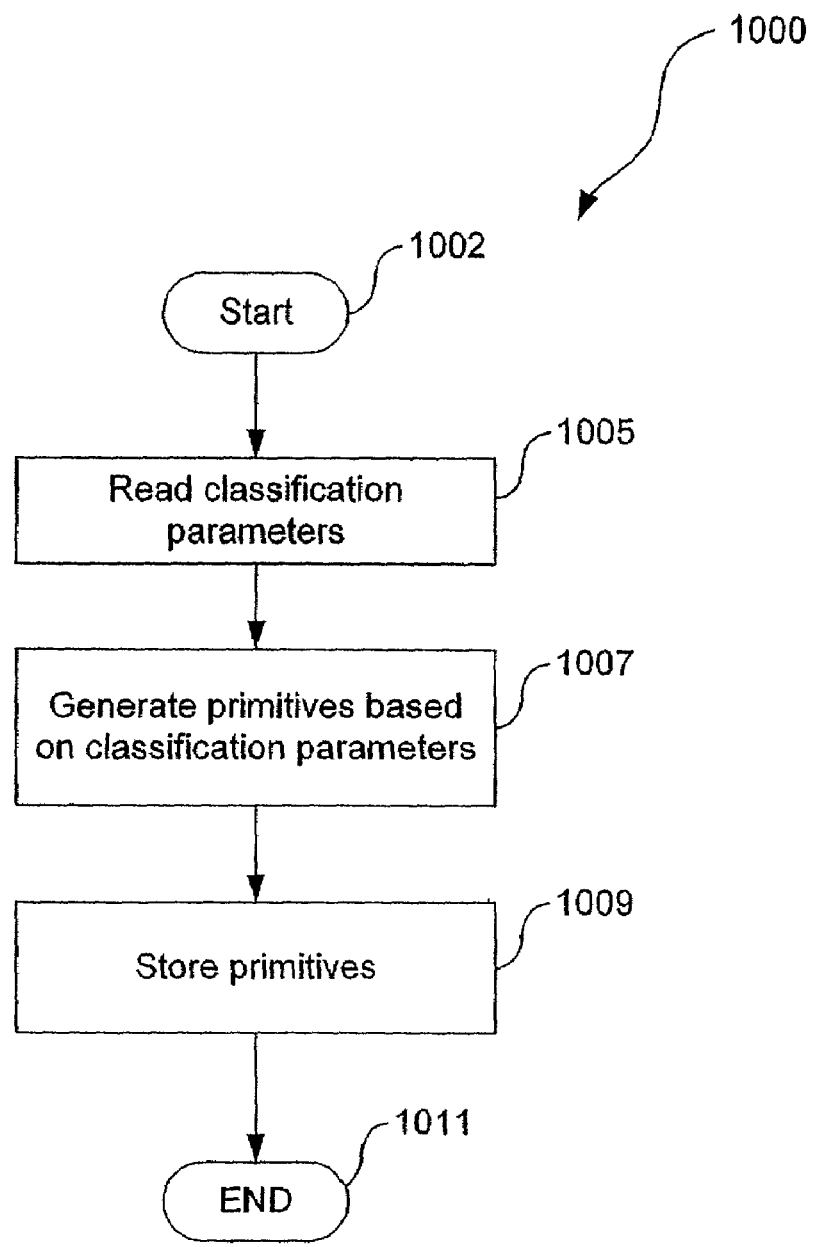
FIG. 10 is a flow diagram illustrating a method for generating primitives from classification parameters in accordance with embodiments of the present invention.

FIG. 10 depicts a flowchart 1000 of a method for generating primitives according to an embodiment of the present invention. The invention, however, is not limited to the description provided herein with respect to flowchart 1000. Rather, it will be apparent to persons skilled in the relevant art(s) after reading the teachings herein that other functional flows are within the scope and spirit of the present invention. The process begins with step 1002 and immediately proceeds to step 1005.

In step 1005, classification parameters are read (i.e., received). In one embodiment, the classification parameters comprise DOCSIS matching criteria. For example, one of the classification parameters may be related to a destination IP address. In one embodiment, a dynamic service message is received, and the DOCSIS classification parameters are read from the dynamic service message. Similarly, in embodiments of the present invention, the classification parameters may be read from a configuration file (e.g., a binary configuration file), a cable modem configuration request, or a dynamic service message.

In step 1007, primitives are generated based on their associated classification parameters. In an embodiment of the present invention in which primitives are serially applied to the target data packet, the primitives may be generated in an optimized fashion. For example, if the target data packet's source IP address is required to be a specific value, first determining whether the target data packet is of the type IP before actually verifying the target data packet's source IP address could improve the efficiency of the classification process. Thus, the primitives are optimized to ensure the optimal execution speed of the classification process. In one embodiment of the present invention, steps 1005 and 1007 occur as part of a cable modem registration process. Steps 1005 and 1007 may also occur during generation of a new service flow in an embodiment of the present invention.

In step 1009, the primitives are stored. For example, in the embodiment of the present invention, in which primitives are serially applied to the target data packet, the optimized set of primitives will eventually be used to test the target data packet for adherence to the classification parameters with which the primitives are associated. This adherence test can be performed to determine whether the target data packet will be transmitted on the particular service flow for which the primitives were generated, for example.

Finally, the process ends with step 1011.

Figure 11:
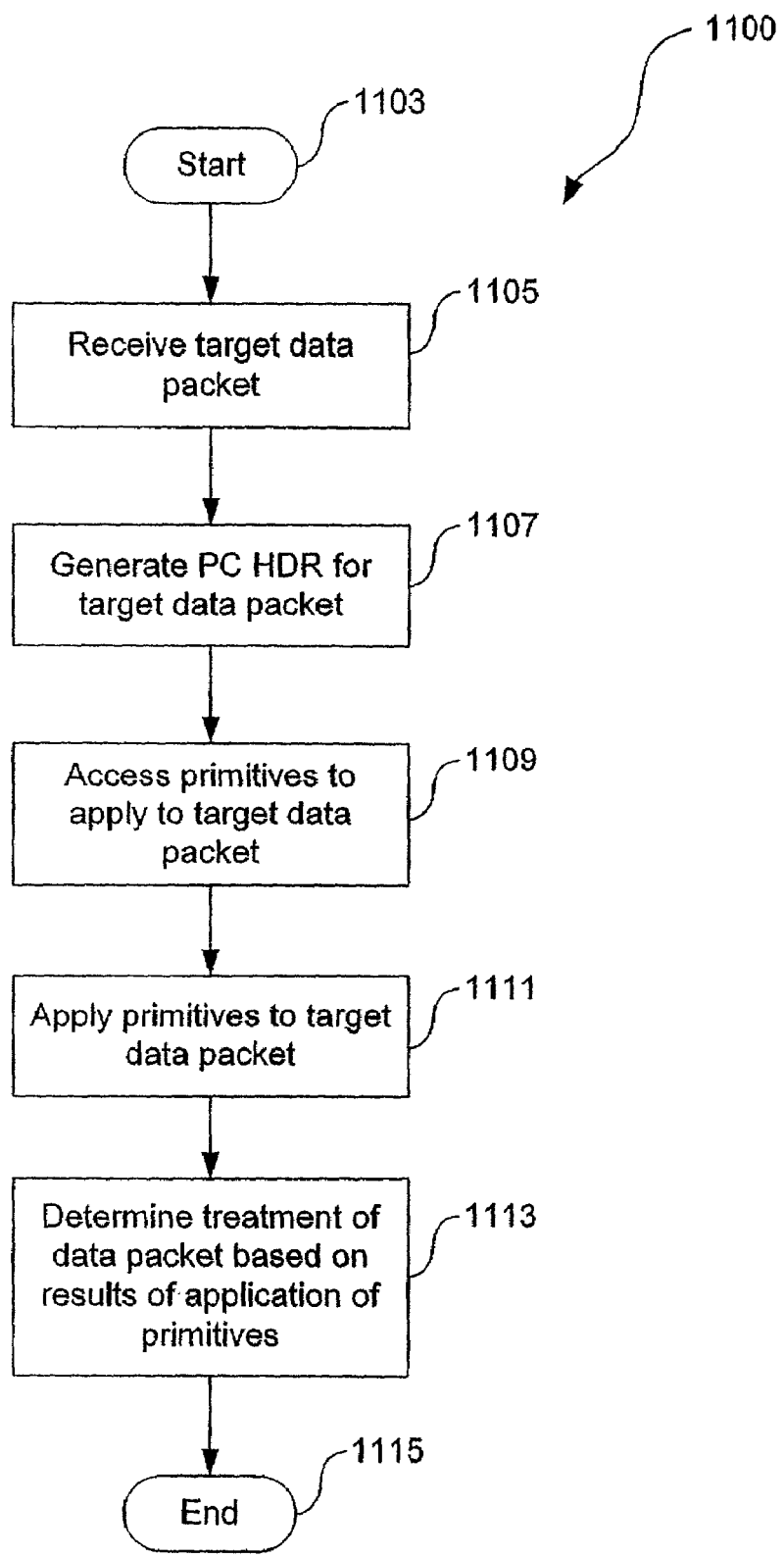
FIG. 11 is a flow diagram illustrating a method for testing a target data packet for adherence to classification parameters in accordance with embodiments of the present invention.

FIG. 11 depicts a flowchart 1100 of a method for testing pre-defined fields of the target data packet for adherence to classification parameters, according to an embodiment of the present invention. The invention, however, is not limited to the description provided herein with respect to flowchart 1100. Rather, it will be apparent to persons skilled in the relevant art(s) after reading the teachings herein that other functional flows are within the scope and spirit of the present invention. The process begins with step 1103 and immediately proceeds to step 1105.

In step 1105, a target data packet is received. In step 1107, a pre-classification header is generated for the target data packet. The pre-classification header may include contents such as those described in FIG. 6, for example.

In step 1109, the set of primitives to be applied to (i.e., executed against) the target data packet is accessed. For example, each service flow can have a corresponding set of primitives for testing a target data packet for adherence to the standards specified by the classification parameters with which the primitives are associated. In an embodiment, the sets of primitives are accessed in sequential order.

In step 1111, the accessed primitives are applied to the target data packet. In one embodiment, the primitives are applied to the pre-defined fields of the target data packet in a parallel manner (i.e., substantially simultaneously). In another embodiment, however, the primitives are applied to the pre-defined fields of the target data packet in a serial manner (i.e., sequentially). For example, as described in FIG. 10, each generated primitive may be associated with at least one classification parameter. Thus, in step 1111, the primitives are applied to the target data packet to test pre-defined field(s) of the target data packet for adherence to the classification parameters with which the primitives are associated. The generated primitives may test the destination IP address field of the target data packet to determine if it is consistent with the destination IP address specified by the particular classification parameter, for example.

In step 1113, treatment of the target data packet is determined based on results of application of the primitives to the pre-defined fields of the target data packet. For example, all primitives may return indications that the target data packet adheres to the values specified by the classification parameters with which the primitives are associated. In this situation, a determination may be made to transmit the target data packet on a particular service flow with which the primitives are associated, for example.

Alternatively, at least one primitive may return an indication that the target data packet does not adhere to the value specified by the classification parameters with which the primitives are associated. In this situation, a result can be returned indicating that the packet does not meet the specification of this particular set of classification parameters.

Finally, the process ends in step 1115.

Figure 12:
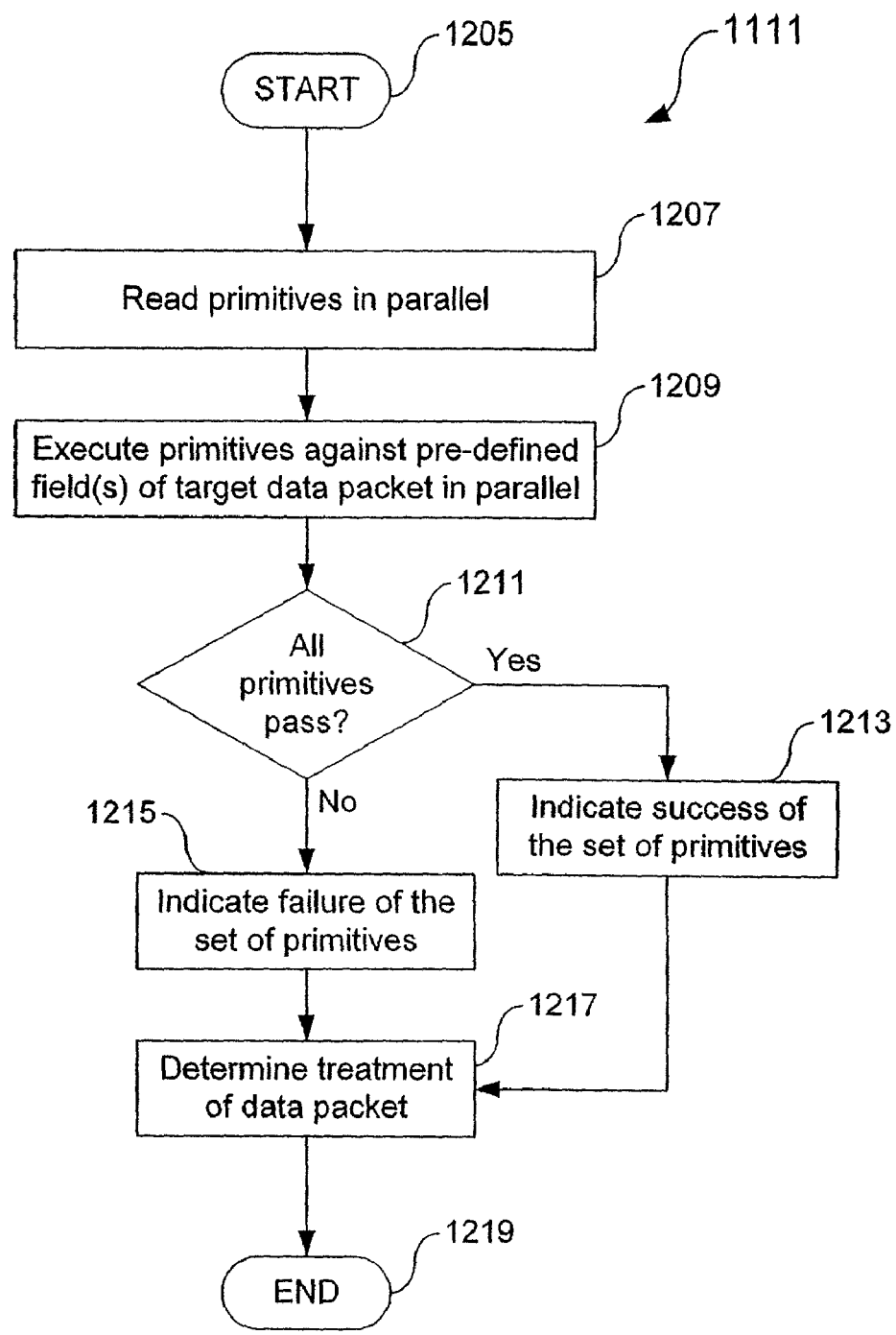
FIG. 12 is a flow diagram illustrating a method for applying primitives to pre-defined field(s) of a data packet in accordance with embodiments of the present invention.

FIG. 12 depicts a flowchart 1111 of a method for parallel testing pre-defined fields of the target data packet for adherence to classification parameters, in accordance with embodiments of the present invention. The flowchart 1111 of FIG. 12 illustrates the steps involved in step 1111 of FIG. 11 according to an embodiment of the present invention. The invention, however, is not limited to the description provided herein with respect to flowchart 1205. Rather, it will be apparent to persons skilled in the relevant art(s) after reading the teachings provided herein that other functional flows are within the scope and spirit of the present invention.

The process begins with step 1205 and proceeds immediately to step 1207. In step 1207, the primitives are read in parallel. In other words, after the interpreter 905 (in FIG. 9) generates the primitives, and in step 1207, the primitives are read simultaneously.

In step 1209, the primitives are simultaneously executed against the pre-defined field(s) of the target data packet to test the target data packet for adherence to the standards specified by the classification parameters with which the primitives are associated. For example, the target data packet may undergo testing to determine whether it adheres to the classification parameters which identify a particular service flow. In the embodiment shown in FIG. 12, the primitives can be simultaneously executed against the pre-defined fields of the target data packet to determine whether it should be transmitted on the particular service flow, for example. The target data packet is transmitted on the particular service flow if each primitive returns an indication that the particular pre-defined field(s) of the target data packet adheres to the standard specified by the classification parameter(s) with which the particular primitive is associated.

For example, a particular primitive may test for a specific destination IP address, as specified by the classification parameter with which the primitive is associated. The primitive can return an indication that the destination IP address field of the target data packet is consistent with the specific destination IP address specified by the classification parameter(s) with which the primitive is associated if the field value equals the specific destination IP address value as specified by the classification parameter.

In step decision step 1211, a determination is made as to whether all primitives returned an indication that the target data packet adhered to the standard as specified by the classification parameters with which the primitives are associated (i.e., it is determined whether the primitives passed). If all primitives did not pass (i.e. at least one primitive returned an indication of non-adherence), in step 1211, a determination is made indicating that all of the primitives did not pass. Control then proceeds to step 1215, where an indication of failure of the set of primitives is returned.

On the other hand, in decision step 1211, if all primitives pass, control proceeds to step 1213. In step 1213, a successful indication of the set of primitives is returned. In other words, in step 1213, each primitive in the set of primitives passed.

The process then continues with step 1217. In step 1217, a determination is made of how to treat the target data packet based on the indication returned by all of the primitives. For example, if all of the primitives returned a successful indication, then the target data packet may be transmitted on the particular service flow identified by the classification parameters with which the primitives are associated. On the other hand, if at least one of the primitives returned an indication of failure, then the target data packet would not be transmitted on the particular service flow identified by the set of classification parameters. Rather, because of the non-adherence of the target data packet, it may be transmitted on a default service flow. The present invention is not limited to testing to determine whether the target data packet should be transmitted on a particular service flow. Rather, it will be apparent to persons skilled in the relevant art(s) after reading the teachings provided herein that other functional flow diagrams are within the scope of the present invention. For example, the target data packet can undergo testing to determine packet header suppression. Finally, the process proceeds to step 1219, where control ends.

Figure 13:
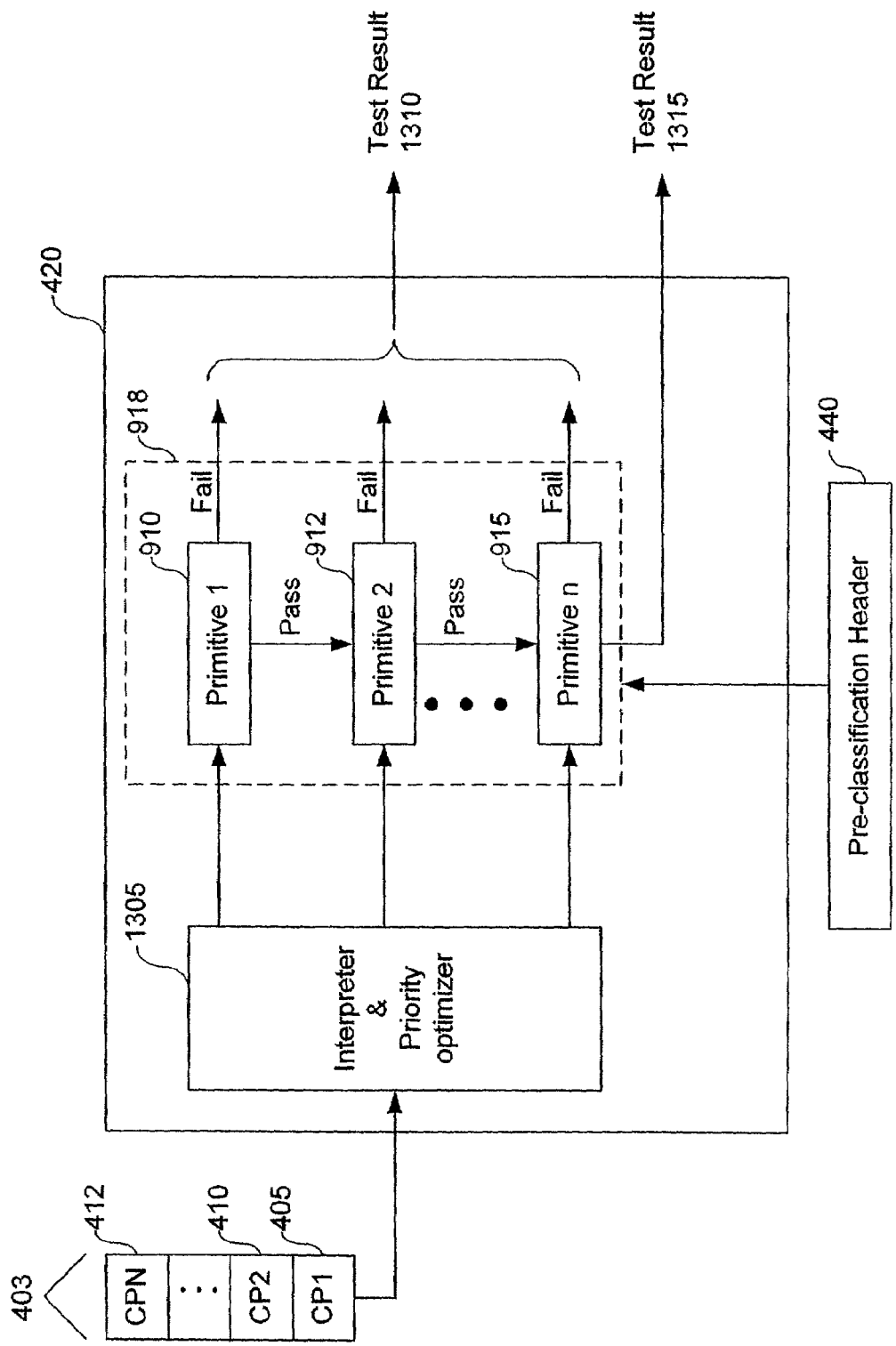
FIG. 13 is a block diagram illustrating a primitive generator/optimizer and serial primitive test applicator in accordance with embodiments of the present invention.

FIG. 13 is a block diagram illustrating a serial primitive test applicator in accordance with embodiments of the present invention. Functionality of the individual elements of the system will be described in FIG. 13. Operation of the system will be described in FIG. 14. Referring now to FIG. 13, the primitive generator and test applicator 420 comprises interpreter and priority optimizer 1305 and primitives 918. Classification parameters 403 and pre-classification header 440 serve as inputs to the primitive generator and test applicator 420. Primitive generator and test applicator 420 produces test results 1310 or 1315.

The interpreter and priority optimizer 1305 generates the primitives 918 from the classification parameters 403. Further, the interpreter and priority optimizer 1305 orders the primitives 918 to ensure optimal execution speed of the classification process.

The primitives 918 are generated by the interpreter and priority optimizer 1305. The primitives 918 test the target data packet for adherence to the standard specified by the classification parameters with which the primitives are associated. For example, the primitive 910 may be based on the classification parameter 405.

The classification parameters 403 are interpreted by the interpreter and priority optimizer 1305 to produce the primitives 918. The classification parameters 403 specify a standard to which the target data packet must adhere.

The pre-classification header 440 allows "easy lookup" of the addresses of pre-defined field(s) of the target data packet. As explained above, the pre-classifier 440 aids in allowing the classification process to achieve improved efficiency.

The test results 1310 and 1315 are produced according to indications from the primitives 918 after being applied to (i.e., executed against) the target data packet. For example, if all of the primitives pass, the test result 1315 can be returned. Alternatively, if at least one of the primitives fails, the next primitive is not executed. This avoids the execution of unnecessary tests and allows the classification process to obtain an optimal execution speed. The test result 1310 can then be returned, indicating that the set of primitives failed.

Figure 14:
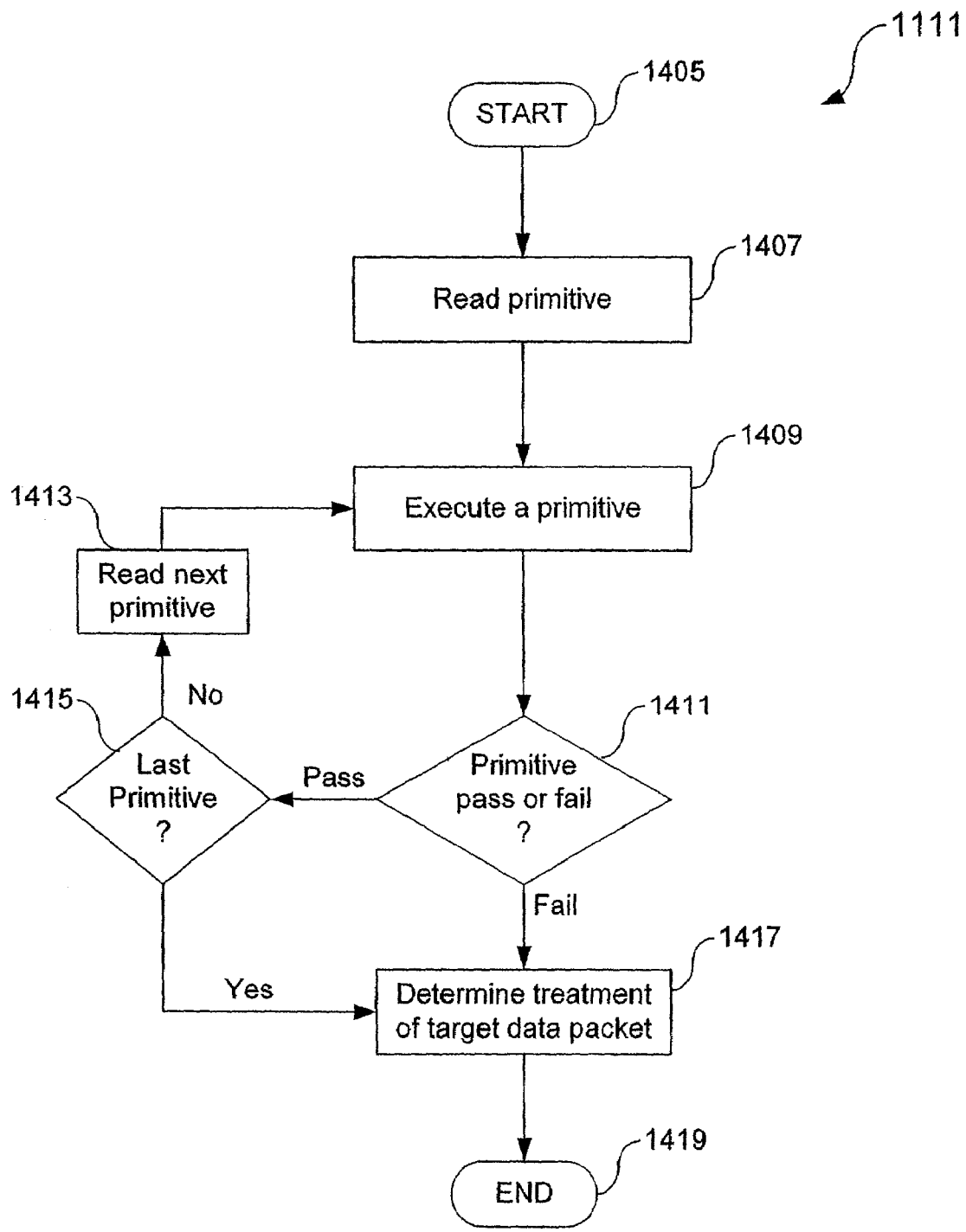
FIG. 14 is a flow diagram illustrating a method for serially applying primitives to pre-defined field(s) of a data packet entering a cable modem system in accordance with embodiments of the present invention.

FIG. 14 illustrates a method for serially applying primitives to pre-defined field(s) of a target data packet entering a cable modem system in accordance with embodiments of the present invention. The flowchart 1111 of FIG. 14 illustrates the steps involved in step 1111 of FIG. 11 according to an embodiment of the present invention. Further, FIG. 14 illustrates operation of the system depicted in FIG. 13.

Referring now to FIG. 14, the process begins with step 1405 and proceeds immediately to step 1407. In step 1407, a primitive is read.

In step 1409, a primitive is executed. In the embodiment of the present invention depicted in FIG. 4, the primitive is executed in a serial manner (i.e., one primitive is executed at a time). Execution of a second primitive does not begin until a first primitive has completed its execution. Thus, in step 1409, a first primitive is executed.

In decision step 1411, a determination is made of whether the executed primitive passes or fails. If the executed primitive returns an indication that the target data packet fails, then the serial execution process ceases. The next primitive to be executed is not executed. Rather, the process proceeds to step 1417.

Alternatively, in decision step 1411, if a determination is made that the executed primitive has returned an indication that the target data packet adheres to the standard specified by the classification parameter(s) with which the primitive is associated (e.g., the primitive passes), then the serial primitive execution process continues and control proceeds to decision step 1415.

In decision step 1415, it is determined whether the executed primitive was the last primitive to be executed. If the executed primitive was not the last primitive to be executed, the next primitive to be executed is read in step 1413 and control proceeds again to step 1409, where the next primitive is executed.

If, however, in decision step 1415, if it is determined that the executed primitive was the last primitive to be executed, then there are no more primitives to be executed. In this situation, the process proceeds to step 1417.

In step 1417, a determination is made of how to treat the target data packet. For example, if the particular primitive currently undergoing execution returns a failed indication, then the target data packet would not be transmitted on the particular service flow identified by the set of classification parameters. Rather, because of the non-adherence of the target data packet with the standard specified by the classification parameter(s) with which the primitive is associated, it may be transmitted on a default service flow. The present invention is not limited to testing to determine whether the target data packet should be transmitted on a particular service flow. Rather, it will be apparent to persons skilled in the relevant art(s) after reading the teachings provided herein that other functional flow diagrams are within the scope of the present invention. For example, the target data packet could undergo testing to determine packet header suppression.

One advantage of the serial application method depicted in FIG. 14 is that primitive execution can be halted at any time, thereby avoiding the execution of unnecessary tests of the target data packet. For example, a first primitive can be executed to determine whether the target data packet is an IP type of data packet. A second primitive can be used to test the destination IP address field of the target data packet. If the first primitive fails, the target data packet is a non-IP type of data packet. Thus, execution of the second primitive need not occur because a non-IP type data packet does not have a destination IP address. The time saved in not having to execute the unnecessary test of the second primitive allows the classification process depicted in FIG. 14 to obtain optimal execution speed.

Finally, the process proceeds to step 1419, where control ends.

FIG. 15A illustrates the format of an example classification primitive 1501 for a one, two, and four byte primitive operation, in accordance with embodiments of the present invention.

The classification primitive 1501 comprises operation code field 1525, offset field 1540, reserved field 1545, a first operand field 1550, a second operand field 1555, and a third operand field 1560.

Operation code field 1525 indicates the particular primitive operation to be performed and will be describe in greater detail in FIG. 15C.

The offset field 1540 of the classification primitive 1501 can contain an eight bit offset value to aid in determining the actual offset value of the target data packet field to be acted upon. Thus, the offset field 1540 can assist in locating the pre-defined field(s) of the target data packet to be acted upon.

Field 1545 is reserved. The first operand field 1550 can contain a mask value with which the pre-defined field of the target data packet is masked to obtain a value for comparison to a value specified by a classification parameter(s) on which the primitive is based. The result of the mask operation is compared with a value in the second operand field 1555.

Similarly, the field 1560 can contain a comparison value with which the result of the application of the mask value in the first operand field 1550 is compared. For example, the primitive operation can be a range operation. In this operation, the mask value in the first operand 1550 is applied to the pre-defined target data packet to produce a result. A determination is then made of whether this result is between a range as defined by the second operand 1555 and the third operand 1560 (e.g., the second operand 1555 identifies a low bound of the range, and the third operand 1560 identifies a high bound of the range).

FIG. 15B illustrates the format of an example classification primitive 1502 for six byte primitive operations, in accordance with embodiments of the present invention.

Example classification primitive 1502 comprises operation code field 1565, offset field 1575, reserved field 1580, a first operand field 1585 and a second operand field 1590. Classification primitive 1502 is similar to classification primitive 1501. Thus, the various fields of the classification primitive 1502 will not be described in detail. The classification primitive 1502 differs from the classification primitive 1501 in that the primitive 1502 allows operations on six byte quantities of data.

FIG. 15C illustrates a byte format of the operation code fields 1525 and 1565 classification primitives 1501 and 1502 (shown in FIGS. 15A and 15B, respectively) in accordance with embodiments of the present invention.

Operation code field 1525/1565 comprises operation code 1526, base_reg field 1530, and size field 1535.

Operation code 1526 is a value identifying a particular primitive operation to be executed. In one embodiment of the present invention, for example, the following primitive operations can be defined: a mask operation, a range operation, and a bit operation.

In the mask operation, the one, two, or four byte pre-defined target data packet field can be masked with a value in the first operand field 1550 and compared with a constant value stored in the second operand field 1555, for example. The mask operation returns the result of the comparison.

In the range operation, the one, two, or four byte pre-defined target data packet field is masked with a value in the first operand field 1550. The result of this mask operation is compared with the value in the second operand field 1555 and the third operand field 1560 to determine whether the masked field is greater than the value in the second operand 1555 but less than or equal to the value in the third operand field 1560.

In the bit operation, the one, two, or four byte pre-defined target data packet field is masked with bit-significant mask values in the first operand field 1550, the second operand field 1555, and the third operand field 1560 of the primitive such that all bits set in the first operand field 1550 are also set in the pre-defined target data packet field, and at least one of the bits set in the second operand field 1555 is also set in the pre-defined target data packet field, and none of the bits set in the third operand field 1560 are set in the pre-defined target data packet field.

The base_reg field 1530 can contain a value indicating which of the base offsets from the pre-classification header should be added to the eight bit offset field of the primitive to derive the actual offset of the target data packet field to be acted upon. Thus, the base_reg field 1530, in conjunction with the offset field of the primitive, assists in locating the target data packet field to which the particular primitive will be applied.

For example, in one embodiment of the present invention, a first bit of the base_reg field 1530 can indicate that the base offset for the SNAP protocol should be added to the eight bit offset field of the primitive to derive the actual offset of the target data packet field to be acted upon. The second bit can indicate that the base offset for the TL_Base protocol should be used. A third bit can indicate that a base offset for a protocol of the type 802.1 should be used. A fourth bit can indicate that a base offset for the IP protocol should be used, and so forth. Alternatively, the base_reg field 1530 can be an index into the set of base registers. For example, a value of zero can indicate DIX_Base in this situation.

The size field 1535 can contain a code indicating the size of the pre-defined target data packet field to be acted upon. For example, in one embodiment of the present invention, four different sizes can be defined. In this embodiment, the size field 1535 can contain a code indicating that the field is a byte-size field (an unsigned 8-bit field), a word size field (an unsigned 16-bit field), a long size field (an unsigned 32-bit field), or an address size field (an unsigned 48-bit field).

FIG. 16A illustrates exemplary data values of a maximum six-byte format representation of a primitive in accordance with embodiments of the present invention. For example, the data values in FIG. 16A can be used to test the target data packet for compliance with portions of the following rule (The data values in FIG. 16A can be used to test the target data packet for compliance with the portions of the following rule in which mask operations are executed. The data values in FIG. 16B can be used to test the target data packet for compliance with the portions of the following rule in which bit and range operations are to be executed:

If the destination MAC address is 01:02:03:04:00:00 when masked with ff:ff:ff:ff:00:00; the Source MAC address is 09:0a:0b:0c:00:00 when masked with ff:ff:ff:ff:00:00; 802.1 PQ priority is >=2 and <=7; the source IP address is 120.02.0.0/255.255.0.0; the destination IP address is 120:03.0.0/255.255.0.0; IP precedence is ROUTINE; the TCP source port is odd and >=121 and <=151; the TCP destination port is even and >=200 and <=250, then transmit the target data packet on the "Y" service flow.

In row 1600, a mask operation is performed to verify the destination MAC address. Thus, the value in op_code field 1526 indicates that a mask operation is to be performed.

The value in the base_reg field 1530 indicates that the base offset value for the 802.2 SNAP header from the pre-classification header should be added to the eight bit offset field of the primitive to derive the actual offset of the target data packet field to which the primitive operation will be applied.

The value in the size field 1535 indicates that the size of the pre-defined target data packet field to be acted upon is of the address size. The value in the offset field is zero, indicating that the value to which the base offset value for the 802.2 SNAP header will be added is zero.

Field 1580 is reserved. The first operand field 1585 contains a mask value to be applied to the destination MAC address field of the target data packet (shown in hexadecimal form). The second operand field 1590 contains a comparison value with which the result of the masking operation is compared to determine if the destination MAC address field of the target data packet is in compliance with the 802.2 SNAP destination address specified by the classification parameter on which the primitive in column 1600 is based.

Similarly, row 1605 illustrates a primitive for verifying the source MAC address of the target data packet. Row 1610 illustrates a primitive for verifying the IP source address of the target data packet. Row 1615 illustrates a primitive for verifying the IP destination address of the target data packet. Row 1620 illustrates a primitive for verifying the normal IP precedence of the target data packet.

FIG. 16B illustrates exemplary data values of a maximum six-byte format representation of a primitive in accordance with embodiments of the present invention. The data values in FIG. 16B can be used to test the target data packet for compliance with the portions of the above-referenced rule in which bit and range operations are to be executed.

For example, in row 1600b, a bit operation is performed to ensure the target data packet is of the protocol type IP/802.1 PQ/TCP. Thus, the value in op_code field 1526 indicates that a bit operation is to be performed.

The value in the base_reg field 1530 indicates that the base offset value for the pre-classification header should be added to the eight bit offset field of the primitive to derive the actual offset of the target data packet field to which the primitive operation will be applied.

The value in the size field 1535 indicates that the size of the pre-defined target data packet field to which the primitive is to be applied is of the byte size. The value in the offset field is zero, indicating that the value to which the base offset value for the pre-classification header will be added is zero.

Reserved field 1580 is reserved. The first operand field 1550, the second operand field 1555, and the third operand field 1560 each contain a mask value to be applied. The mask in the first operand field 1550 is applied to a field via an "AND" function, and a positive result is returned if the result equals the mask value. The mask in the second operand field 1555 is applied to a field via an "AND" function, and a positive result is returned if the result is not equal to the value zero. The mask in the third operand field 1560 is applied to a field via an "AND" function, and a positive result is returned if the result is equal to the value zero. One primitive is responsible for applying the three tests using operand 1, operand 2, and operand 3. The primitive passes only if all three tests pass.

Similarly, row 1605b illustrates a primitive for verifying that the TCP source port of the target data packet is an odd value and the TCP destination port is an even value. Row 1610b illustrates a primitive for verifying the 802.1PQ priority is greater than the value 2 and less than or equal to the value seven. Row 1615b illustrates a primitive for verifying the TCP source port range. Row 1620b illustrates a primitive for verifying the TCP destination port range.

According to the rule described above, the target data packet can be transmitted on service flow "Y" if all of the primitives return an indication that the target data packet is in compliance with the classification parameters with which the primitives are associated. If at least one of the primitives returns an indication that the target data packet is not in compliance with the classification parameter(s) on which the primitive is based, the rule will fail. As a result of the failure of the rule, the target data packet will not be transmitted on the service flow "Y."

D. Environment of the Present Invention

As discussed elsewhere herein, the above-described techniques or methods may be executed as software routines, in part, by the Media Access Control (MAC) portion of a cable modem and the headend MAC portion of a CMTS. For example, with reference to the example implementation of cable modem 108a described in FIG. 1, the cable modem 108a includes a MAC (not shown) for performing necessary method steps by executing software functions with the assistance of a Central Processing Unit (CPU). These software functions are stored in a memory, such as but not limited to a Random Access Memory (RAM) or a Read Only Memory (ROM). Furthermore, with reference to the example implementation of CMTS 104, the headend MAC performs necessary method steps by executing software functions with the assistance of a CPU. These software functions are also stored in a memory, which may comprise either a RAM or a ROM.

Figure 17:
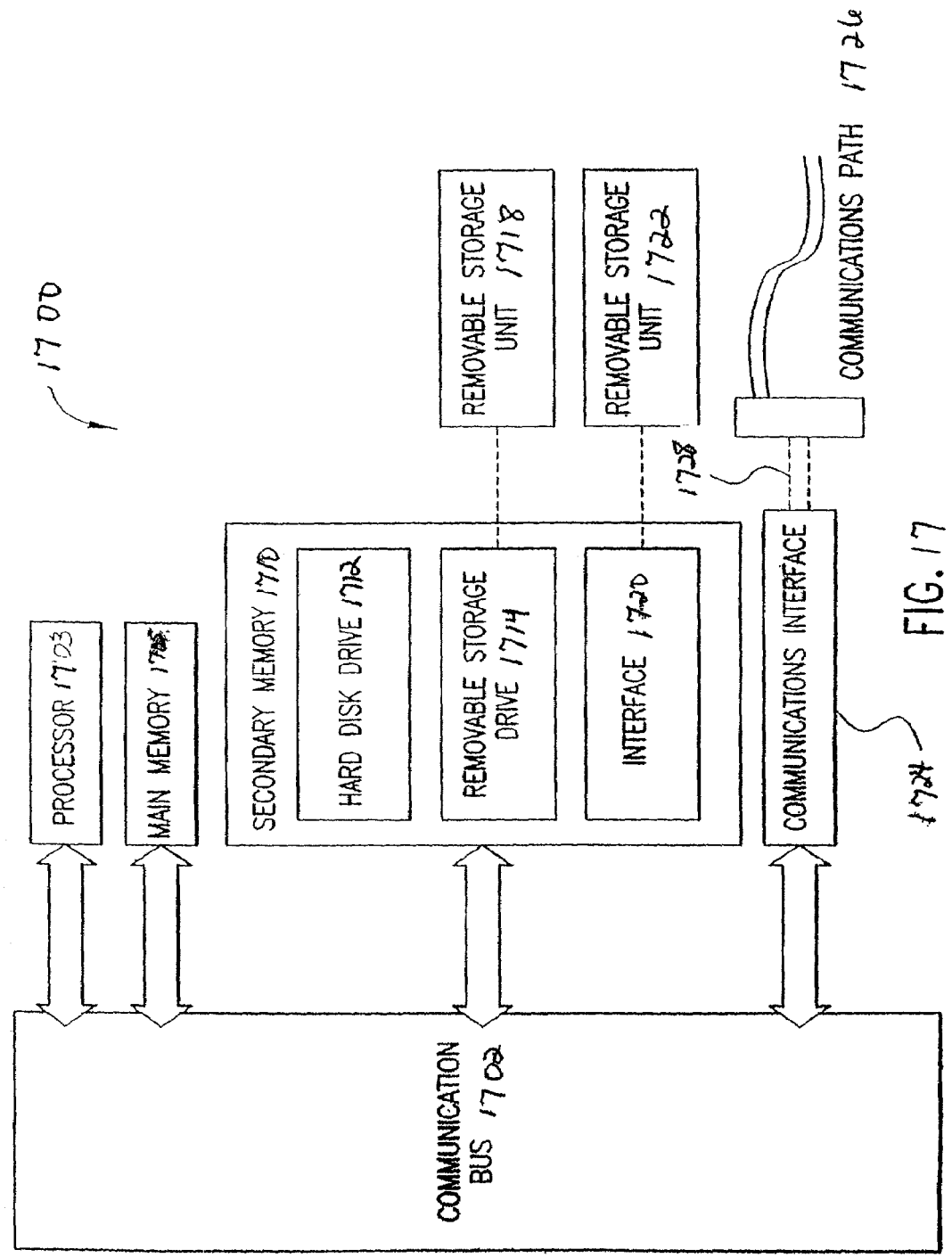
FIG. 17 is a diagram illustrating an exemplary computer system on which a method in accordance with embodiments of the present invention can be performed.

However, methods of the present invention need not be limited to these embodiments. For example, the methods of the present invention may be embodied in software routines which are executed on various computer systems, such as a computer system 1700 as shown in FIG. 17. However, after reading this description, it will be apparent to a person skilled in the relevant art how to implement the invention using other computer systems and/or computer architectures. The computer system 1700 includes one or more processors, such as processor 1703. The processor 1703 is connected to a communication bus 1702.

Computer system 1700 also includes a main memory 1705, preferably random access memory (RAM), and may also include a secondary memory 1710. The secondary memory 1710 may include, for example, a hard disk drive 1712 and/or a removable storage drive 1714, representing a floppy disk drive, a magnetic tape drive, an optical disk drive, etc. The removable storage drive 1714 reads from and/or writes to a removable storage unit 1718 in a well-known manner. Removable storage unit 1718, represents a floppy disk, magnetic tape, optical disk, etc., which is read by and written to by removable storage drive 1714. As will be appreciated, the removable storage unit 1718 includes a computer usable storage medium having stored therein computer software and/or data.

In alternative embodiments, secondary memory 1710 may include other similar means for allowing computer programs or other instructions to be loaded into computer system 1700. Such means may include, for example, a removable storage unit 1722 and an interface 1720. Examples of such may include a program cartridge and cartridge interface (such as that found in video game devices), a removable memory chip (such as an EPROM, or PROM) and associated socket, and other removable storage units 1722 and interfaces 1720 which allow software and data to be transferred from the removable storage unit 1722 to computer system 1700.

Computer system 1700 may also include a communications interface 1724. Communications interface 1724 allows software and data to be transferred between computer system 1700 and external devices. Examples of communications interface 1724 may include a modem, a network interface (such as an Ethernet card), a communications port, a PCMCIA slot and card, a wireless LAN (local area network) interface, etc. Software and data transferred via communications interface 1724 are in the form of signals 1728 which may be electronic, electromagnetic, optical, or other signals capable of being received by communications interface 1724. These signals 1728 are provided to communications interface 1724 via a communications path (i.e., channel) 1726. This channel 1726 carries signals 1728 and may be implemented using wire or cable, fiber optics, a phone line, a cellular phone link, a wireless link, or other communications channels.

In this document, the term "computer program product" refers to removable storage units 1718 and 1722. These computer program products are means for providing software to computer system 1700. The invention is directed to such computer program products.

Computer programs (also called computer control logic) are stored in main memory 1705, and/or secondary memory 1710 and/or in computer program products. Computer programs may also be received via communications interface 1724. Such computer programs, when executed, enable the computer system 1700 to perform the features of the present invention as discussed herein. In particular, the computer programs, when executed, enable the processor 1703 to perform the features of the present invention. Accordingly, such computer programs represent controllers of the computer system 1700.

In an embodiment where the invention is implemented using software, the software may be stored in a computer program product and loaded into computer system 1700 using removable storage drive 1714, hard drive 1712 or communications interface 1724. The control logic (software), when executed by the processor 1703, causes the processor 1703 to perform the functions of the invention as described herein.

In another embodiment, the invention is implemented primarily in hardware using, for example, hardware components such as application specific integrated circuits (ASICs). Implementation of hardware state machine(s) so as to perform the functions described herein will be apparent to persons skilled in the relevant art(s).

In yet another embodiment, the invention is implemented using a combination of both hardware and software.

E. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A method for classifying a data packet in a network interface, comprising the steps of:
   (a) receiving a plurality of classification parameters;
   (b) generating a plurality of program modules, each of said plurality of program modules for testing for adherence to at least one corresponding classification parameter, wherein the program modules contain an operation code field and one or more operand fields;
   (c) receiving the data packet;
   (d) generating a header, said header indicating whether one or more predefined fields are present in the data packet and identifying a location of said one or more predefined fields in the data packet when present, wherein the location is identified by an address value that defines the position of the one or more predefined fields within the data packet in terms of an exact position or in terms of a position plus an offset;
   (e) executing each of said plurality of program modules based on said operation code field, wherein each of said plurality of program modules receives said header and generates a test result based on contents of said header and contents of the data packet; and
   (f) processing the data packet based on said test results from said plurality of program modules.

2. The method of claim 1, wherein said classification parameters comprise DOCSIS classification parameters.

3. The method of claim 1, wherein step (f) comprises applying packet header suppression to the data packet based on said test results from said plurality of program modules.

4. The method of claim 1, wherein step (f) comprises transmitting the data packet over a selected service flow based on said test results from said plurality of program modules.

5. The method of claim 1, wherein step (f) comprises rejecting the data packet for violating classification parameters based on said test results from said plurality of program modules.

6. The method of claim 1, wherein step (a) comprises receiving a configuration file, said configuration file including said plurality of classification parameters.

7. The method of claim 1, wherein step (a) comprises receiving a cable modem configuration request, said cable modem configuration request including said plurality of classification parameters.

8. The method of claim 1, wherein step (a) comprises receiving a dynamic service message, wherein said dynamic service message includes said plurality of classification parameters.

9. The method of claim 1, wherein said steps (a) and (b) occur as part of a cable modem registration process.

10. The method of claim 1, wherein said steps (a) and (b) occur during generation of a new service flow.

11. The method of claim 1, wherein said header is concatenated to the data packet.

12. The method of claim 1, wherein step (e) comprises executing each of said plurality of program modules in parallel.

13. The method of claim 1, wherein step (f) comprises the steps of:
- combining said test results from said plurality of program modules using a logical AND operation; and
- processing the data packet based on a result of said logical AND operation.

14. A method for classifying a data packet in a network interface, comprising the steps of:
  (a) receiving a plurality of classification parameters;
  (b) generating a plurality of optimized program modules, each of said plurality of program modules for testing for adherence to at least one corresponding classification parameter, wherein the plurality of optimized program modules contain an operation code field and one or more operand fields;
  (c) receiving the data packet;
  (d) generating a header, said header indicating whether one or more predefined fields are present in the data packet and identifying a location of said one or more predefined fields in the data packet when present, wherein the location is identified by an address value that defines the position of the one or more predefined fields within the data packet in terms of an exact position or in terms of a position plus an offset;
  (e) serially executing said plurality of program modules based on said operation code field, wherein each of said plurality of program modules receives said header and generates a test result based on contents of said header and contents of the data packet used to generate the header, until one of said plurality of program modules generates a failing test result; and
  (f) processing the data packet based on whether a failing test result was generated in step (e).

15. A computer program product comprising a computer usable medium having computer program logic for enabling a processor in a network interface to classify a data packet, the computer program logic comprising:
  first computer control logic means for enabling the processor to receive a plurality of classification parameters;
  second computer control logic means for enabling the processor to generate a plurality of program modules, each of said plurality of program modules for testing for adherence to at least one corresponding classification parameter, wherein the program modules contain an operation code field and one or more operand fields;
  third computer control logic means for enabling the processor to receive the data packet;
  fourth computer control logic means for enabling the processor to generate a header, said header indicating whether one or more predefined fields are present in the data packet and identifying a location of said one or more predefined fields of the data packet when present, wherein the location is identified by an address value that defines the position of the one or more predefined fields within the data packet in terms of an exact position or in terms of a position plus an offset;
  fifth computer control logic means for enabling the processor to execute each of said plurality of program modules based on said operation code field, wherein each of said plurality of program modules receives said header and generates a test result based on contents of said header and contents of said data packet; and
  sixth computer control logic means for enabling the processor to process the data packet based on said test results from said plurality of program modules.

16. The computer program product of claim 15, wherein said first computer control logic means comprises means for enabling the processor to receive DOCSIS classification parameters.

17. The computer program product of claim 16, wherein said sixth computer control logic means comprises means for enabling the processor to apply packet header suppression to the data packet based on said test results from said plurality of program modules.

18. The computer program product of claim 16, wherein said sixth computer control logic means comprises means for enabling the processor to transmit the data packet over a selected service flow based on said test results from said plurality of program modules.

19. The computer program product of claim 16, wherein said sixth computer control logic means comprises means for enabling the processor to reject the data packet for violating classification parameters based on said test results from said plurality of program modules.

20. The computer program product of claim 16, wherein said first computer control logic means comprises means for enabling the processor to receive a plurality of classification parameters retrieved from a configuration file.

21. The computer program product of claim 16, wherein said first computer control logic means comprises means for enabling the processor to receive a plurality of classification parameters retrieved from a cable modem configuration request.

22. The computer program product of claim 16, wherein said first computer control logic means comprises means for enabling the processor to receive a plurality of classification parameters retrieved from a dynamic service message.

23. The computer program product of claim 16, wherein said first computer control logic means and said second computer control logic means are executed as part of a cable modem registration request.

24. The computer program product of claim 16, wherein said first computer control logic means and said second computer control logic means are executed during generation of a new service flow.

25. The computer program product of claim 16, wherein said fourth computer control logic means comprises means for enabling the processor to concatenate said header to the data packet.

26. The computer program product of claim 16, wherein said fifth computer control logic means comprises means for enabling the processor to execute each of said plurality of program modules in parallel.

27. The computer program product of claim 16, wherein said sixth computer control logic means comprises means for enabling the processor to combine said test results from said plurality of program modules using a logical AND operation and process the data packet based on a result of said logical AND operation.

* * * * *

UNITED STATES PATENT AND TRADEMARK OFFICE
CERTIFICATE OF CORRECTION

PATENT NO. : 7,423,975 B2 Page 1 of 1
APPLICATION NO. : 10/087779
DATED : September 9, 2008
INVENTOR(S) : Johnson et al.

It is certified that error appears in the above-identified patent and that said Letters Patent is hereby corrected as shown below:

<u>Column 26</u>
Line 32, please replace "cable modern" with --cable modem--.

Signed and Sealed this

Thirtieth Day of December, 2008

JON W. DUDAS
*Director of the United States Patent and Trademark Office*